US008132819B2

(12) United States Patent
Landau et al.

(10) Patent No.: US 8,132,819 B2
(45) Date of Patent: Mar. 13, 2012

(54) ROLLING CONTAINER ASSEMBLY WITH MOUNT STRUCTURE

(75) Inventors: Eitan Landau, Ramat-Gan (IL); Noam Twig, Petach Tikva (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 363 days.

(21) Appl. No.: 12/467,139

(22) Filed: May 15, 2009

(65) Prior Publication Data

US 2010/0290877 A1 Nov. 18, 2010

(51) Int. Cl.
*B62B 1/00* (2006.01)

(52) U.S. Cl. ............. 280/47.26; 280/47.131; 280/47.18; 280/47.19; 312/249.4

(58) Field of Classification Search ............. 280/47.131, 280/47.11, 24, 26, 47.17, 47.18, 30, 79.11, 280/47.19; 414/490; 206/373; 220/4.31; 312/107–109
See application file for complete search history.

(56) References Cited

U.S. PATENT DOCUMENTS

| | | | | |
|---|---|---|---|---|
| 3,522,955 | A * | 8/1970 | Warner, Jr. | 280/655.1 |
| 4,118,048 | A | 10/1978 | Spranger et al. | |
| 4,119,044 | A | 10/1978 | Hines | |
| 4,281,843 | A | 8/1981 | Johnson et al. | |
| 5,176,281 | A | 1/1993 | Fiore | |
| 5,193,706 | A | 3/1993 | Hanna et al. | |
| 5,244,265 | A | 9/1993 | Chiang | |
| 5,378,005 | A | 1/1995 | Norton | |
| 5,634,649 | A | 6/1997 | Breining et al. | |
| 5,641,170 | A | 6/1997 | Helm | |
| 5,680,932 | A | 10/1997 | Dickinson et al. | |
| 5,799,958 | A | 9/1998 | Bishop | |
| D404,916 | S | 2/1999 | Dickinson et al. | |
| 5,906,381 | A | 5/1999 | Hovatter | |
| 5,938,396 | A * | 8/1999 | Audet | 414/490 |
| 5,950,828 | A | 9/1999 | Bal | |
| 6,131,926 | A | 10/2000 | Harlan | |
| 6,170,839 | B1 | 1/2001 | Kizewski | |
| 6,176,559 | B1 | 1/2001 | Tiramani et al. | |
| D437,484 | S | 2/2001 | Tiramani et al. | |
| 6,264,220 | B1 | 7/2001 | Pierce et al. | |
| 6,347,847 | B1 * | 2/2002 | Tiramani et al. | 312/108 |
| 6,371,320 | B2 * | 4/2002 | Sagol | 220/4.27 |
| D462,168 | S | 9/2002 | Klemmensen et al. | |
| D462,170 | S | 9/2002 | Chen et al. | |
| 6,601,930 | B2 * | 8/2003 | Tiramani et al. | 312/108 |
| 6,761,366 | B1 * | 7/2004 | Klemmensen et al. | 280/47.26 |
| 6,817,623 | B1 * | 11/2004 | Gerutto | 280/655.1 |
| 7,367,571 | B1 * | 5/2008 | Nichols | 280/47.18 |

(Continued)

*Primary Examiner* — J. Allen Shriver, II
*Assistant Examiner* — James Triggs
(74) *Attorney, Agent, or Firm* — Pillsbury Winthrop Shaw Pittman LLP

(57) ABSTRACT

A rolling container assembly includes a base container, wheels to provide rolling support, at least one removable container, and a container engaging region with an automatic lock interacting between the removable container and the container engaging region. The automatic lock is releasable so that the removable container can be released to enable the at least one removable container to be carried by its carrying handle and transported separately from the base container. The assembly has a lower drawer and an upper drawer, and a slide structure having a first portion mounted to the upper drawer and a second portion mounted to the lower drawer to facilitate movement of the drawers. The lower drawer and upper drawer are independently movable between their respective open and closed positions. The apparatus includes a central frame structure carrying a lock member that enables the upper drawer to be locked in the closed position.

28 Claims, 22 Drawing Sheets

U.S. PATENT DOCUMENTS

| | | | | |
|---|---|---|---|---|
| 7,467,801 | B1 * | 12/2008 | Garduno | 280/47.26 |
| 7,503,569 | B2 * | 3/2009 | Duvigneau | 280/47.18 |
| 7,628,406 | B1 * | 12/2009 | Thomas et al. | 280/47.19 |
| 7,845,653 | B2 | 12/2010 | Katz | |
| 7,883,096 | B2 * | 2/2011 | Katz et al. | 280/47.26 |
| 7,938,412 | B2 * | 5/2011 | Katz | 280/47.34 |
| 2002/0113387 | A1 | 8/2002 | Chen | |
| 2007/0194543 | A1 | 8/2007 | Duvigneau | |
| 2008/0079227 | A1 | 4/2008 | Angellotto | |
| 2008/0084036 | A1 | 4/2008 | Keeler | |
| 2011/0049824 | A1 | 3/2011 | Bar-Erez et al. | |

* cited by examiner

ROLLING CONTAINER ASSEMBLY WITH MOUNT STRUCTURE

FIELD OF THE INVENTION

The present invention relates to a rolling container assembly.

BACKGROUND OF THE INVENTION

Rolling tool container assemblies are commonly used to carry a plurality of working tools to the working location. However, such tool container assemblies typically have side walls that contribute to the weight of the assembly or have drawers that cannot be moved independently. Tool container assemblies also typically do not have removable storage containers that are easily connectable after being removed. There is a need in the art for an improved storage system.

SUMMARY OF THE INVENTION

One aspect of this invention provides an apparatus for transporting articles between working locations. The apparatus includes a base container having an interior space in which articles to be transported can be stored and one or more rotatable ground engaging wheels mounted towards the bottom of the apparatus for rotation about an axis to provide rolling support for the apparatus. The apparatus further includes at least one removable container having a container portion with an interior space in which articles to be transported can be stored, a lid pivotally connected to the container portion, a latch arrangement constructed to secure the lid in covering relation with respect to the container portion, and a carrying handle attached to the lid and that is manually graspable to enable carriage of the removable container. The apparatus also includes a container engaging region disposed above the base container and an automatic lock interacting between the at least one removable container and the container engaging region, the automatic lock including a lock member that moves from a first position to a second position to lock the at least one removable container to the container engaging region in response to the at least one removable container being engaged with the container engaging region. The automatic lock is releasable so that the at least one removable container can be released from the container engaging region to enable the at least one removable container to be carried by the carrying handle and transported separately from the base container. The apparatus also includes a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

Another aspect of the present invention provides an apparatus for transporting articles between working locations. The apparatus includes a lower drawer having an interior space in which articles to be transported can be stored, one or more rotatable ground engaging wheels mounted towards the bottom of the apparatus for rotation about an axis to provide rolling support for the apparatus. The apparatus further includes an upper drawer disposed above the lower drawer and slidable between open and closed positions. The lower drawer is slidable between open and closed positions, wherein in the closed position, an upwardly facing opening of the lower drawer is disposed beneath the upper drawer. The lower drawer and upper drawer are independently movable between their respective open and closed positions. The apparatus further includes a central frame structure carrying a lock member that enables the upper drawer to be locked in the closed position and a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

Another aspect of the present invention provides an apparatus for transporting articles between working locations. The apparatus includes one or more rotatable ground engaging wheels mounted towards the bottom of the apparatus for rotation about an axis to provide rolling support for the apparatus. The apparatus also includes a lower drawer having an interior space in which articles to be transported can be stored and an upper drawer disposed above the lower drawer. The apparatus further includes a slide structure having a first portion mounted to the upper drawer and a second portion mounted to the lower drawer to facilitate movement of the upper and lower drawers between open and closed positions, wherein in the closed position, an upwardly facing opening of the lower drawer is disposed beneath the upper drawer. The lower drawer and upper drawer are independently movable between their respective open and closed positions. The apparatus also includes a manually engageable pulling handle. The pulling handle and the one or more ground engaging wheels are arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1:
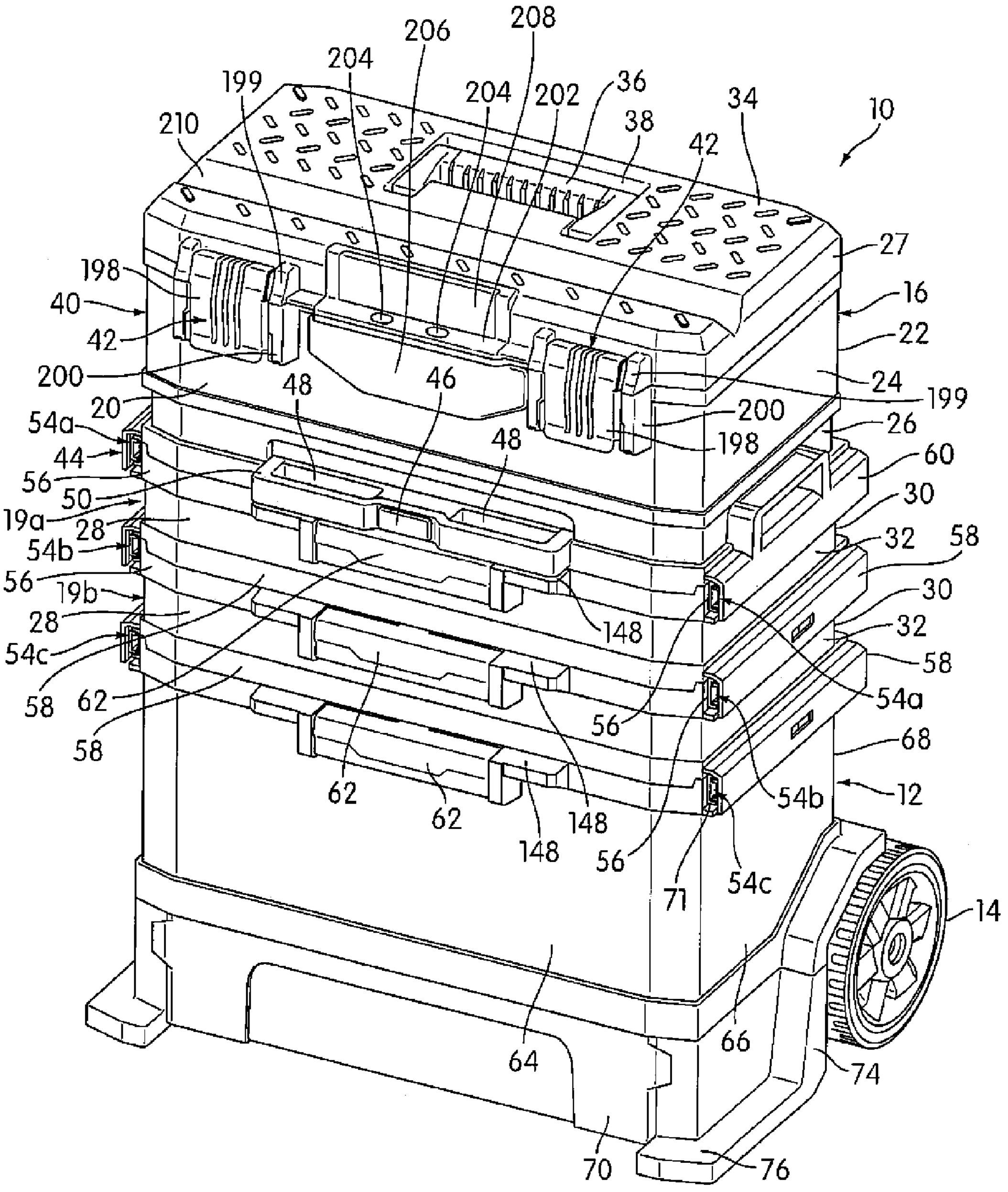
FIG. 1 is a perspective front view of a rolling container system in accordance with an embodiment of the present invention.

FIG. 1 shows a rolling container assembly 10 in accordance with an embodiment of the present invention. The apparatus includes a base container 12, a removable container 16 having a container portion 40 and a lid 34 pivotally attached to the container portion 40, a container engaging region 44 on which the removable container 16 is engaged, and a manually engageable pulling handle 80 (shown in FIG. 2). The embodiment of FIG. 1 also includes two rotatable ground engaging wheels 14 (although only one can be seen in FIG. 1) mounted toward the bottom of the rolling container assembly 10 for rotation about an axis to provide rolling support for the rolling container assembly 10. The number and configuration of wheels 14 is not intended to be limiting, and other embodiments may have more or fewer wheels 14 and in different locations on the rolling container assembly 10. The wheels 14 may have treads on its outer surface and may be fabricated of rubber or other anti-slip material.

The base container 12 of the embodiment shown in FIG. 1 is a drawer that slides from an open position to a closed position. In other embodiments of the present invention, the base container 12 may comprise a pivotal bin or a door connected to the base container 12. In such other embodiments, the pivotal bin or door may be connected to the base container 12 via hinges, screws, bolts, fasteners, or any other mechanism as appreciated by one skilled in the art. Further details relating to the construction and features of the base container in accordance with other embodiments of the present invention are found in U.S. Pat. Nos. 6,601,930; 6,347,847; and 6,176,559, the relevant disclosures of which are included by reference thereto as if fully set forth herein.

The embodiment shown in FIG. 1 also includes smaller, intermediate drawers (two are shown as 19*a* and 19*b*) above the base container 12. The drawers 19*a* and 19*b* each has a front portion 28, a back portion 30, and two side portions 32. The removable container 16 has a lid 34 and a container portion 40. The container portion 40 includes a front portion 20, a back portion 22, two side portions 24, and a lower portion 26. The front portion 20, back portion 22, and side portions 24 of the removable container 16 may be made of metal. The lower portion 26 may be fabricated of plastic. It is contemplated that the container portion 40 in other embodiments may be made of metal, wood, or any other materials or combination of materials known to a person skilled in the art.

In another embodiment, only one intermediate drawer is provided. In another embodiment, three or more intermediate drawers are provided.

In the embodiment shown in FIG. 1, the removable container 16 has the aforementioned lid 34 and a handle 36 located in a hollowed out portion 38 of the lid 34 of the removable container 16. The lid 34 is pivotally connected to the container portion 40. The lid 34 can be latched onto the container portion 40 of the removable container 16 via latches 42. The container latches 42 may vary in numbers (there may be one or more) and may be pivotable latches, buckles, or any other latching mechanism as would be appreciated by one skilled in the art. The lid 34 may be pivotally connected to the container portion 40 using hinges, pins, screws, fastenings, bolts, or any other connection mechanism as would be appreciated by one skilled in the art. The lid 34 may also be a slide-on lid which is slid on to container portion 40 or a snap-on lid that is snapped on to the container portion 40. It is contemplated that the methods of mounting the lid 34 on to the container portion 40 may vary and the number of lids 34 may vary. For example, there may be two lids 34 pivotally connected to the container portion 40 wherein each lid 34 may be opened or closed independently of the other. The removable container 16 will be discussed in further detail later.

The removable container 16 is selectively latched to the container engaging region 44 of the rolling container assembly 10. In one embodiment, the rolling container assembly 10 includes a first actuator 46 that is actuatable to release an automatic lock 52 (shown in FIGS. 9, 10*a*, 10*b*, and 12) interacting between the removable container 16 and the container engaging region 44 so that the removable container 16 can be disengaged from the container engaging region 44 and carried separately.

In the illustrated embodiment, the container engaging region 44 comprises, among other things, a platform or shelf having a top surface 100 (shown in FIG. 3) for engaging the removable container. However, this is but a non limiting example, as the container engaging region 44 can take the form of any structure or configuration that can be used to carry a portion of a latch or lock arrangement, that can cooperate with a portion of a latch or lock arrangement carried by the removable container 16 to enable selective latching of the removable container 16 to the container engaging region 44. The particular structure of the container engaging region 44 illustrated herein is disclosed later in more detail.

In the embodiment shown in FIG. 1, the actuator 46 is a push button and is located between two recesses 48 formed in a projection 50 extending from the container engaging region 44. The recesses 48 may be large enough so that fingers may be placed in the recess 48 for counter support when actuating the actuator 46 with the thumb.

In one embodiment, the rolling container assembly 10 includes slides 54*a* (shown in FIGS. 6*a*, 6*b*, and 6*c*), 54*b*, 54*c*, and 54*d* that enable the drawers 19*a* and 19*b* and the base container 12 to slide between an open position wherein the contents of the drawers 19*a* and 19*b* and the base container 12 may be accessed and a closed position wherein the contents of the drawers 19*a* and 19*b* and the base container 12 may not be accessed (as shown in FIGS. 4*a*, 4*b*, 5*a*, and 5*b*). In the embodiment shown in FIG. 1, the drawer 19*a* is slidably held between two slides 54*a* at the top of drawer 19*a* and two slides 54*b* at the bottom of drawer 19*a*, the drawer 19*b* is slidably held between two slides 54*b* at the top of drawer 19*b* and two slides 54*c* at the bottom of drawer 19*b*, and the base container 12 is slidably held between two slides 54*c* at the top of the base container 12 and two slides 54*d* at the bottom of the base container 12 (shown in FIG. 5*b*). The slides 54*a*, 54*b*, and 54*c* may be two-way extension ball bearing slides that allow movement of both the inner and outer slide members. Details of the slides 54*a*, 54*b*, 54*c*, and 54*d* and their attachment to the drawers 19*a* and 19*b* and to the base container 12 will be described later.

In one embodiment, the base container 12 and the drawers 19*a* and 19*b* can be supplemented with handles 62. It is contemplated that the location and size of the handles 62 may vary. For example, the handles 62 may be located on the left or to the right rather than in the center of the front of the drawers 19*a* and 19*b* and base container 12, as shown in the embodiment illustrated in FIG. 1. The handles 62 will be described in further detail later.

In the embodiment shown in FIG. 1, the base container 12 has a front portion 64, two side portions 66, and a back portion 68. The base container 12 also has lower portion 70. The lower portion 70 of the base container 12 may be located forwardly of the rotatable ground engaging wheels 14. The lower portion 70 of the base container 12 engages a support structure 72 (shown in FIG. 3) of the rolling container assembly 10. The lower portion 70 may include two protruding legs 74, each leg 74 may be located on a side portion 66 of the base container 12 and in close proximity to a wheel. In one embodiment, the protruding legs 74 extend laterally outwards further from the side portion 66 of the base container 12, thus creating a ledge 76. The base container 12 also has an upwardly facing opening or interior space 73 (shown in FIG. 5*b*), which may be accessed when the base container 12 is in the open position.

The construction and configuration of the rolling container assembly 10 shown is an example and not intended to be limiting. For example, the number of removable containers 16 and drawers 19*a* and 19*b* may vary. It is also contemplated that the drawers 19*a* and 19*b* may vary in size and may not be uniform in size. In the embodiment shown in FIG. 1, the drawers 19*a* and 19*b* and base container 12 are made of plastic. The use of plastic is not intended to be limiting, and the drawers 19*a* and 19*b* and base container 12 may be made of metal, wood, a combination of materials thereof, or any other suitable material as is well known in the art.

Figure 2:
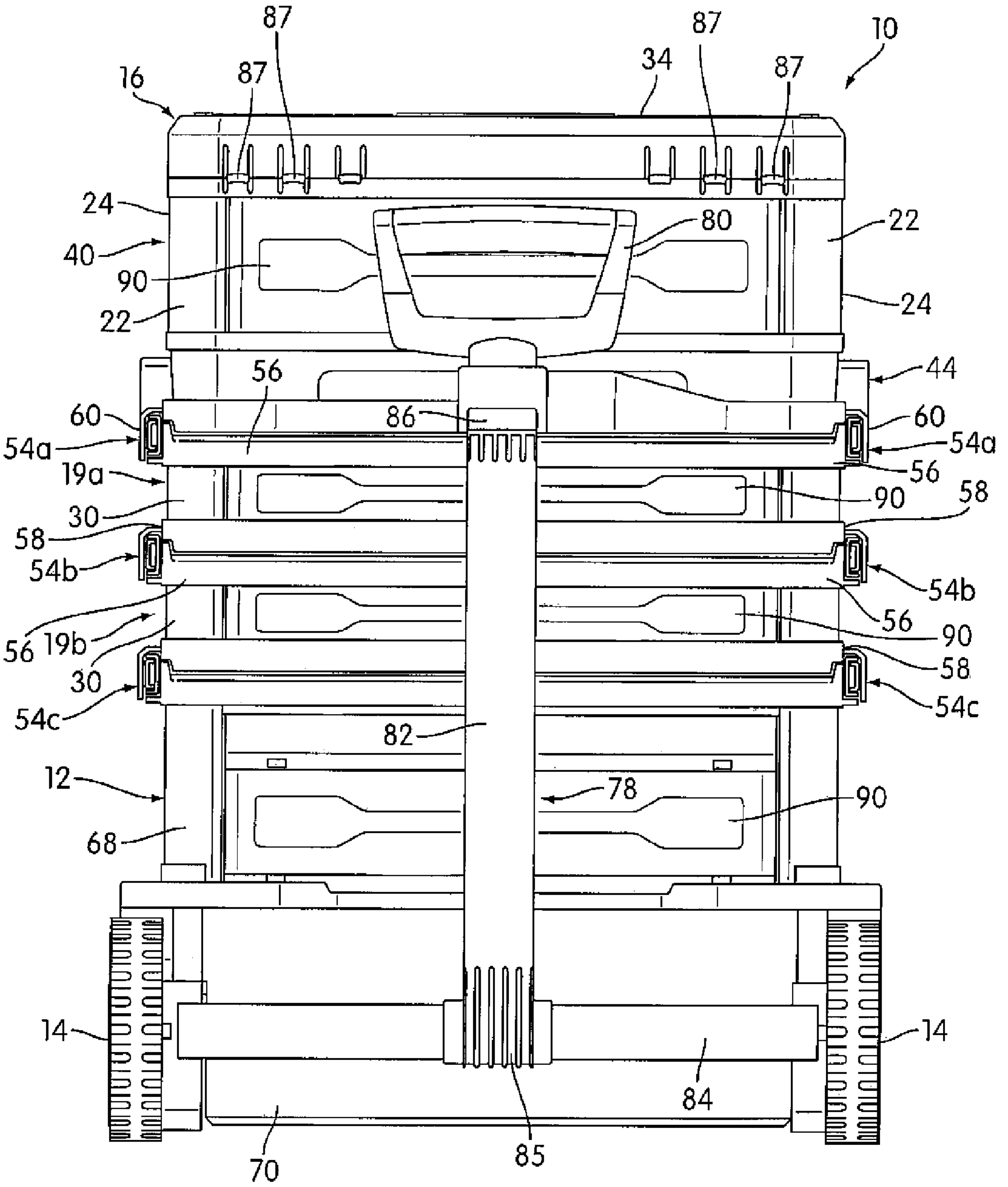
FIG. 2 is a perspective rear view of the rolling container assembly shown in FIG. 1.

FIG. 2 is a perspective rear view of the rolling container assembly 10 shown in FIG. 1. In the embodiment shown in FIG. 2, and as shown more clearly in FIG. 3, the rolling container assembly 10 has a chassis 78 comprising of a handle 80, a central frame structure 82, the container engaging region 44, the two rotatable ground engaging wheels 14, and a horizontal bar 84 extending between the two ground engaging wheels 14. In this embodiment, the horizontal bar 84 is held within a recess 83 (shown in FIG. 5*b*) formed in a lower end portion 85 of the central frame structure 82. It is contemplated that the horizontal bar 84 may be attached to the central frame structure 82 by other known methods, such as the use of adhesive, friction fit, snap fit, fasteners, pins or rivets, or any combination thereof. In this embodiment, the rolling container assembly 10 also includes a handle actuator 86, which may be considered a second actuator, that is actuatable to release a locking member 89 of the handle 80 (shown in FIG. 13*a* and 13*b*) from a lock position to a release position wherein the handle 80 can be extended or retracted.

Figure 3:
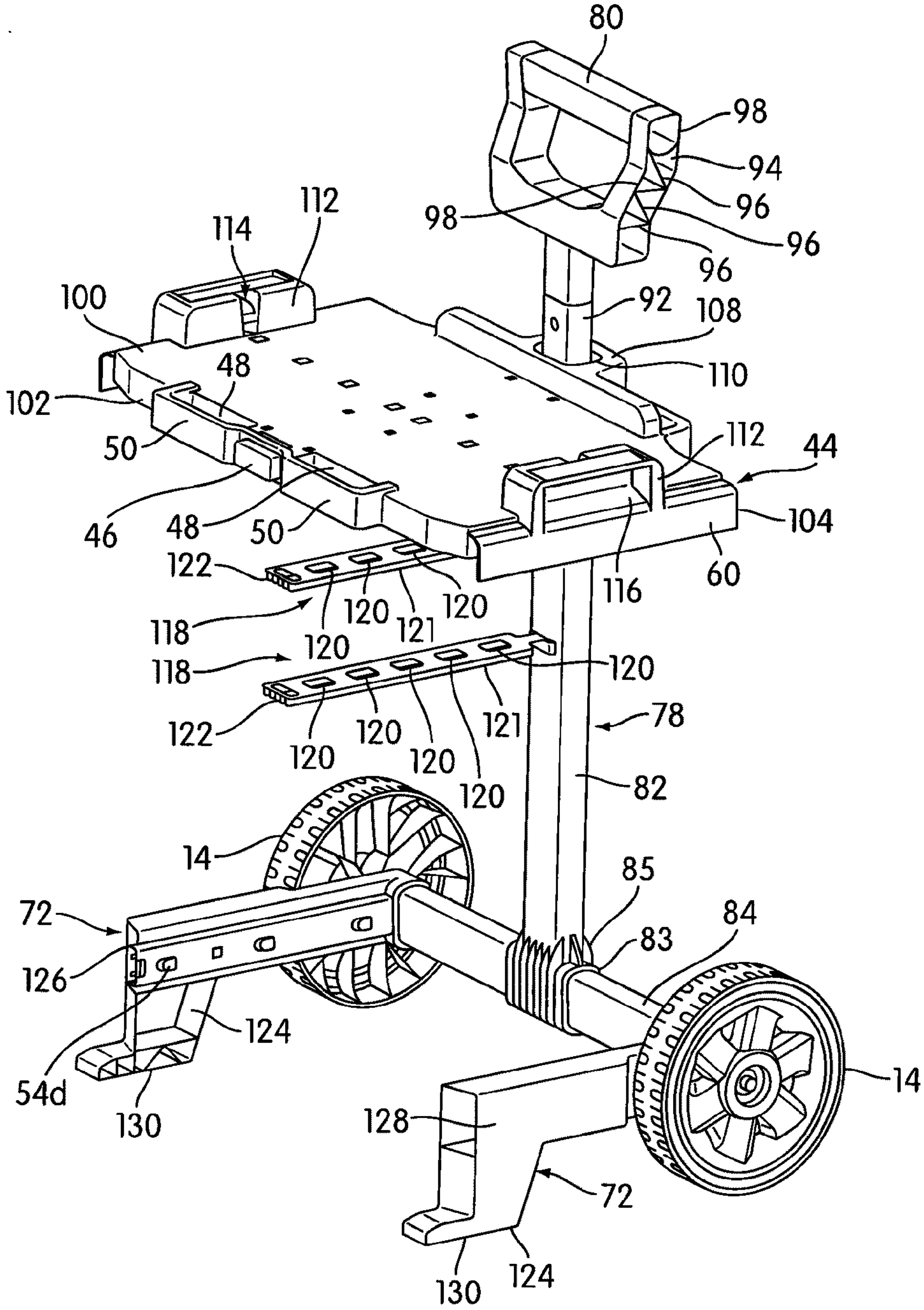
FIG. 3 is a perspective view of a chassis of the rolling container assembly in accordance with an embodiment of the present invention.

FIG. 3 is a perspective view of the chassis 78 of the rolling container assembly 10. In the embodiment shown in FIG. 3, the handle 80 is connected to a telescopic handle member 92 (shown in FIGS. 13*a* and 13*b*) that is held within the hollow central frame structure 82. When the handle 80 is to be extended, the handle 80 may be pulled upwards, thereby causing the telescopic handle member 92 to move out from within the central frame structure 82. In this embodiment, the handle 80 is made of plastic and has a hollow portion 94, wherein the hollow portion 94 has strengthening ribs 96 formed therein. The ribs 96 form triangular shapes along the outer edge 98 of the handle 80. This configuration of the handle 80 allows for the handle 80 to be of lightweight and yet durable material. It is contemplated that the handle 80 may have other shapes. It is contemplated that the handle 80 may also be solid or may be fabricated of other materials, such as metal, wood, or any other materials known to a person skilled in the art. It is also contemplated that the handle 80 may be completely detachable from the rolling container assembly 10 to allow for separation of the components thereof for transportation or storage in confined spaces, i.e. closets or car trunks.

In one embodiment, the container engaging region 44 is connected to the central frame structure 82. In the embodiment illustrated in FIG. 3, the container engaging region 44 is a shelf The container engaging region 44 has the aforementioned top surface 100, which serves as a support base on which removable container 16 may be disposed when the removable container 16 is engaged to the container engaging region 44; a front portion 102; a back portion 104; and the two lower side portions 60. In one embodiment, the container engaging region 44 has a protrusion 108 located on the back portion 104 of the container engaging region 44, wherein the protrusion 108 is generally between the handle 80 and the central frame structure 82. In the embodiment shown in FIG. 3, the telescopic handle member 92 extends from the central frame structure 82, passes through a hole 110 in the protrusion 108 of the container engaging region 44, and connects to the handle 80.

In the embodiment shown in FIG. 3, the container engaging region 44 has two mounting structures 112, respectively located near the two lower side portions 60 of the container engaging region 44. The mounting structures 112 extend from the top surface 100 of the container engaging region 44, and each mounting structure 112 houses a lock member 114 of the automatic lock 52 that is capable of releasably locking the removable container 16 to the container engaging region 44. The mounting structures 112 may also include depressions 116 on laterally outward sides thereof, wherein the depressions 116 may serve as hand grips to facilitate lifting of the entire rolling container assembly 10 from opposite sides thereof.

As illustrated in FIG. 3, the rolling container assembly 10 includes lock members 118 (two are shown) for the drawers 19*a* and 19*b* and the base container 12. In this embodiment, the lock members 118 each comprise an elongated bar or plank 121 that extends in cantilevered fashion from the central frame structure 82. Each lock member has spaced apart openings 120 along the length of the bar 118. In one embodiment, one of the lock members 118 (not shown) may be attached to the bottom of the container engaging region 44 to lock the drawer 19*a* and 19*b* underneath the container engaging region 44. The lock members 118 have engaging members 122 that lock the associated drawers 19*a* and 19*b* in the closed position. The engaging members 122 will be discussed in further detail later. In one embodiment, the lock members 118 may be made of metal. It is contemplated that the lock members 118 may be fabricated of other materials, such as plastic, wood, or other materials known to a person skilled in the art.

In the embodiment shown in FIG. 3, the support structure 72 of the rolling container assembly 10 comprises the horizontal bar 84 and two support legs 124 extending downward from the horizontal bar 84 in spaced relation to the wheels 14. Each of the support legs 124 has an inside surface 126, an outside surface 128, and a bottom surface 130. The bottom surface 130 engages the ground and is located forwardly of the rotatable ground engaging wheel 14. In the embodiment shown in FIG. 3, when the rolling container assembly 10 is in an upright position, the bottom surface 130 of the support legs 124 and the wheels 14 engages the ground. In this embodiment, when the rolling container assembly 10 is tilted rearwardly to a tilted rolling movement position, thereby enabling the rolling container assembly 10 to be rolled by the wheels 14, the bottom surface 130 of the support legs 124 is lifted from the ground so that only the wheels 14 engage the ground. In another embodiment, the legs 124 are replaced by wheels, so that the rolling container assembly 10 has four wheels, permitting it to roll when standing upright.

In one embodiment, each of the support legs 124 has slides 54*d* on the inside surface 126 thereof the support legs 124. Slides 54*d* enable the lower portion 70 of the base container to slide relative to the support legs 124. Slides 54*d* will be discussed in more detail later.

The configuration and features of the chassis 78 illustrated in FIG. 3 is not intended to be limiting. For example, there may be two horizontal bars 84 connecting the wheels 14 to the chassis 78. The container engaging region 44 may also be connected to the chassis 78 via other attachment mechanisms, such as, for example, screws, bolts, fasteners, welding, or any other mechanism as appreciated by one skilled in the art.

FIGS. 4*a*, 4*b*, 5*a*, and 5*b* illustrate the independent movement of the drawer 19*a* using slides 54*a* and 54*b*, the independent movement of the drawer 19*b* using slides 54*b* and 54*c*, and the independent movement of the base container 12 using slides 54*c* and 54*d*. Slides 54*a*, 54*b*, and 54*c* may be two-way extension ball bearing slides. Examples of ball bearing slides are shown in detail in FIGS. 6*a*, 6*b*, and 6*c*.

Figure 4A:
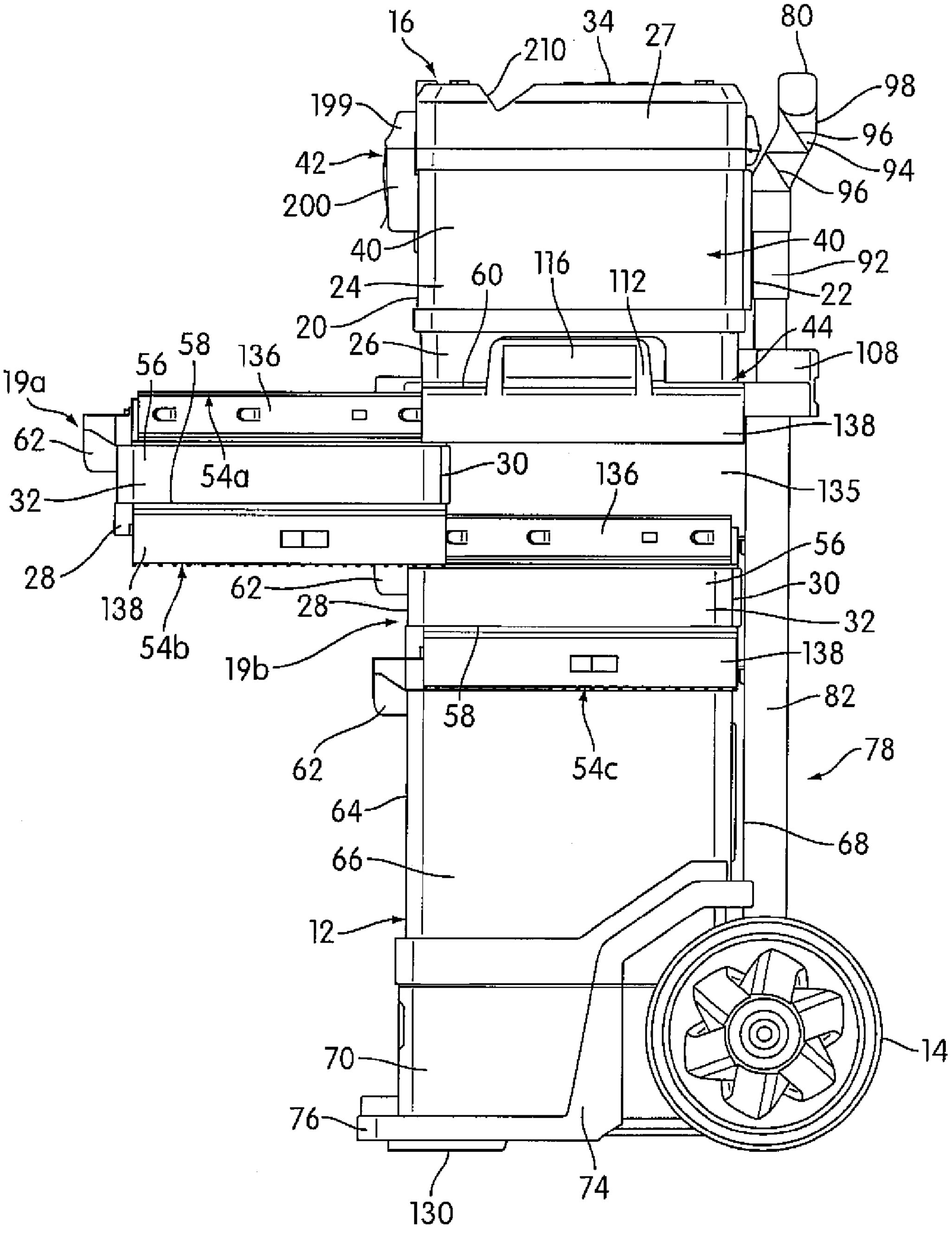
FIG. 4*a* and 4*b* are side views of the rolling container assembly with drawers in an open position.
Figure 5A:
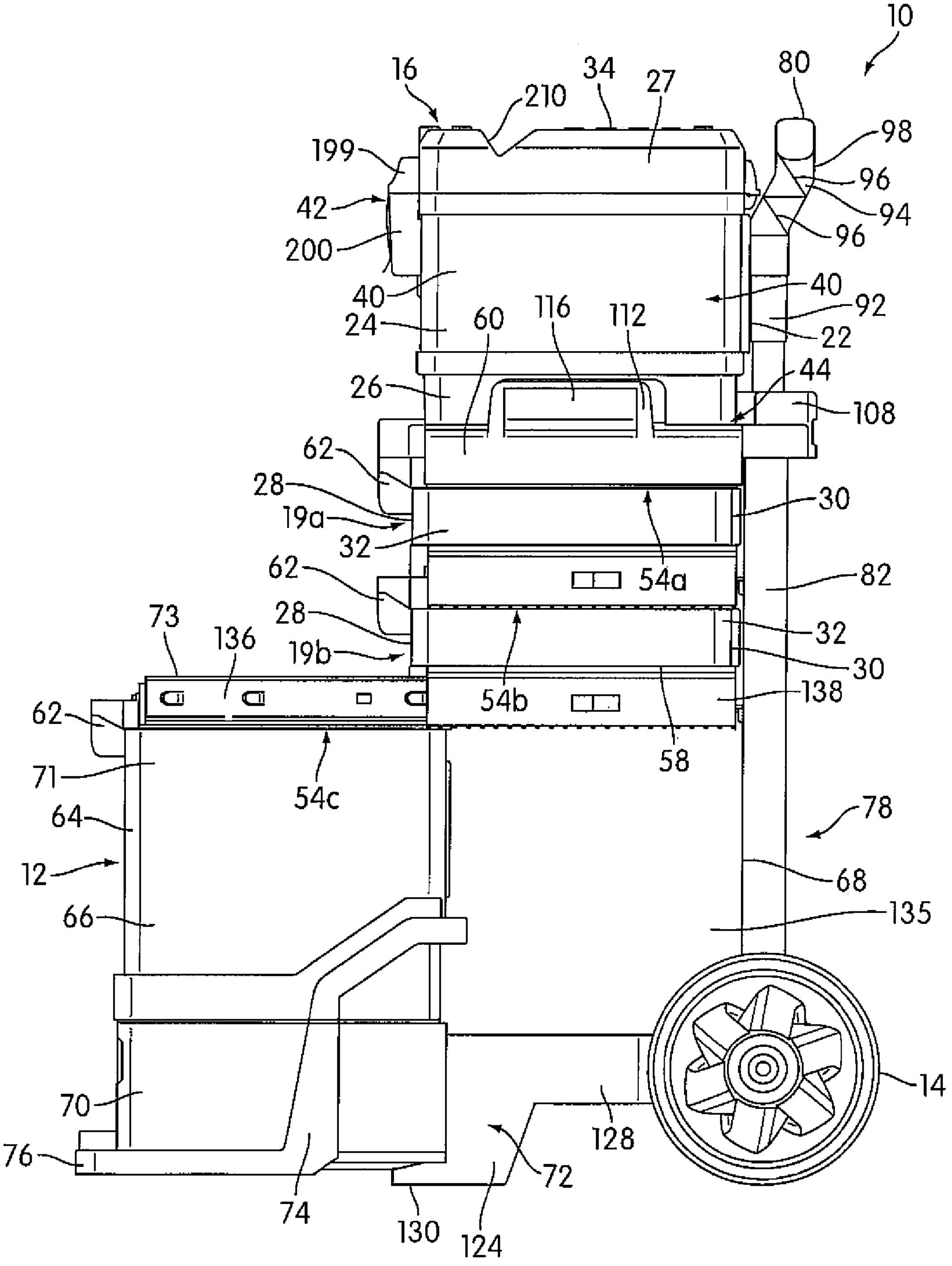
FIG. 5*a* is a side view of the rolling container assembly with a lower drawer in the open position.
Figure 5B:
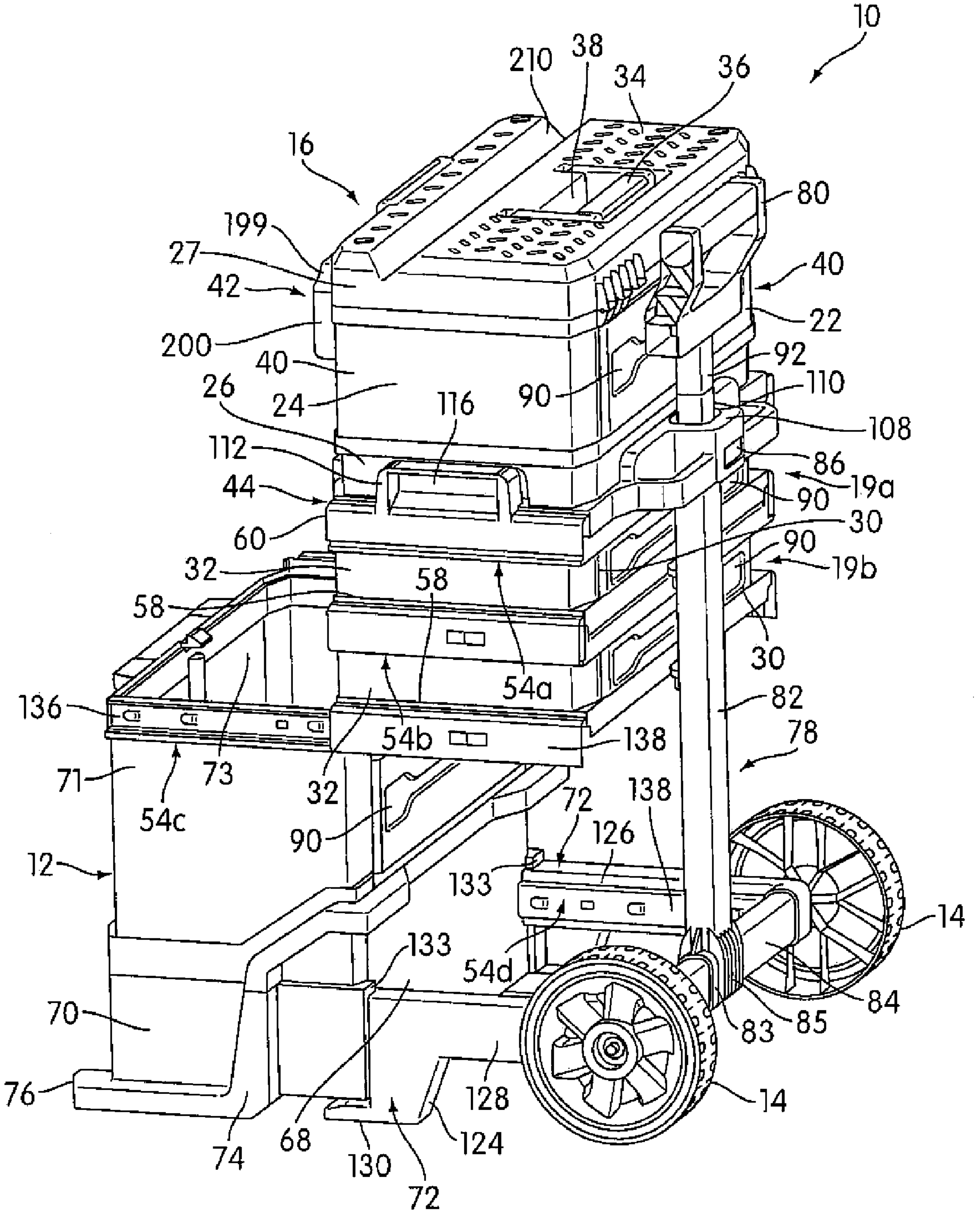
FIG. 5*b* is a rear view of the rolling container assembly with the lower drawer in the open position.
Figure 6A:
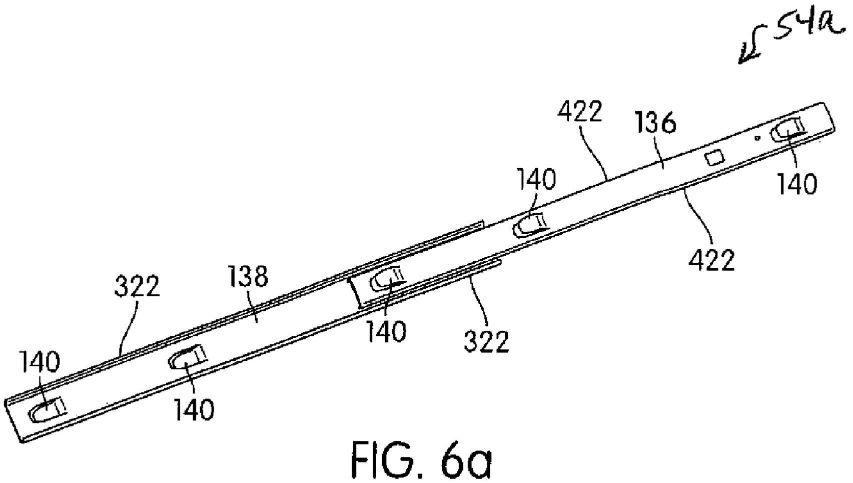
FIG. 6*a*, 6*b*, and 6*c* are perspective views of a slide according to an embodiment of the present invention.
Figure 6B:
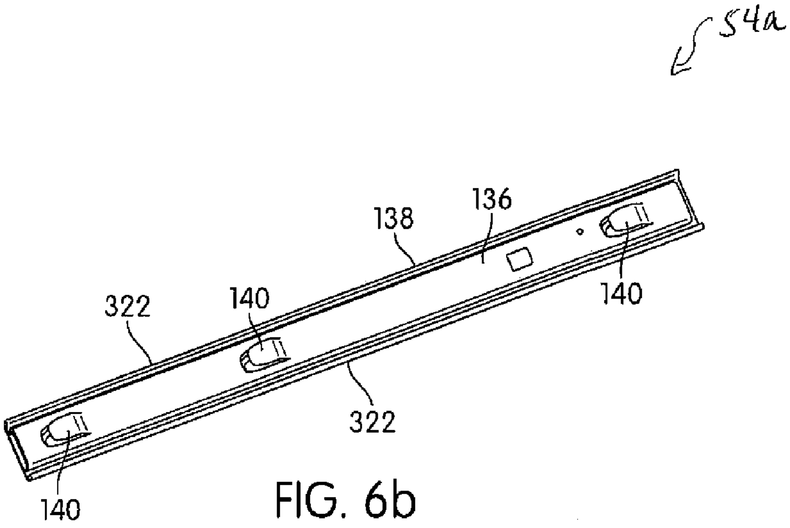
Figure 6C:
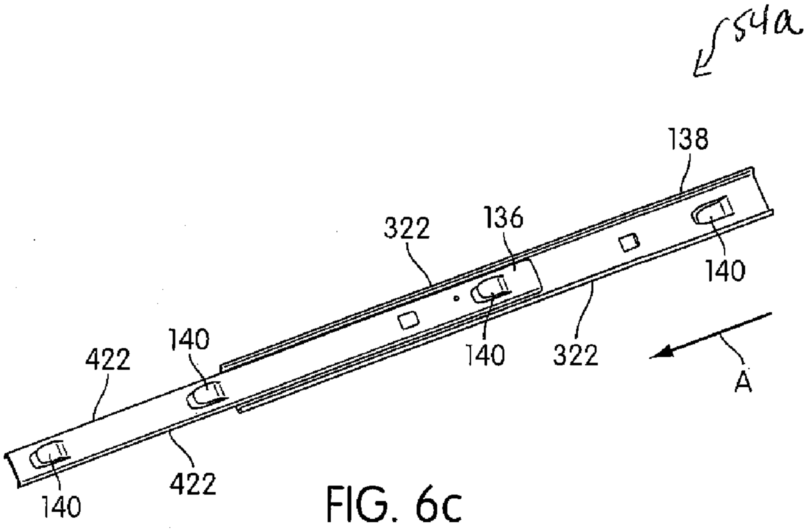

The slides 54*a*, 54*b*, and 54*c* are essentially identical, and slides 54*a* is shown in FIGS. 6*a*-6*c*, although slides 54*b* and 54*c* are essentially the same. Slides 54*d* may also be identical to slides 54*a* or may have different configurations and arrangements (which will be described later). As shown in FIGS. 6*a*, 6*b*, and 6*c*, slides 54*a* includes an inner slide 136 and an outer slide 138. In one embodiment, the outer slide 138 has upper and lower curved flanges 322 that receive the upper and lower portions 422 of inner slide 136 (see FIGS. 6*a*-6*c*). In one embodiment, a bearing structure is disposed between the engaging regions 322 and 422 to facilitate sliding movement therebetween. The bearing structure may comprise ball bearing slides, rollers, wheels, or reduced friction materials as will be appreciated by those skilled in the art. The inner slide 136 and outer slide 138 may also have ears 140 provided along the inner slide 136 and outer slide 138. As shown in FIG. 6*c*, the inner slide 136 slides through the associated outer slide 138 in the direction of A. When a drawer 19*a* or 19*b* is pulled open, the associated slides 54*a*, 54*b*, or 54*c* connected thereto are in an extended position, for example as shown in FIG. 6*a*. When a drawer 19*a* or 19*b* is pushed closed, the associated slides 54*a*, 54*b*, or 54*c* connected thereto are retracted or compacted, for example as shown in FIG. 6*b*. The slides 54*a*-54*d* allow for the independent movement of the drawers 19*a* and 19*b* and the base container 12, as shown in FIGS. 4*a*, 4*b*, 5*a*, and 5*b*. The slides 54*a*-54*d* may have stop elements (not shown) wherein the stop elements prevent the inner slide 136 from being dislocated and completely sliding out of the outer slide 138 or vice versa.

It is contemplated that in some embodiments, slides 54*d* may have different configurations and arrangements from slides 54*a*, 54*b*, and 54*c* such that slides 54*d* are not two-way extension slides. In other words, one of the slide members is fixed relative to the frame and is thus a "one-way" slide rather than a two-way slide. For example, in one embodiment, the inner slides 136 of slides 54*d* are attached (fixed) to the support legs 124 and thus remain stationary. Only the outer slides 138 of slides 54*d* enable movement of the base container 12 by sliding along the inner slides 136.

Referring back to FIG. 4*a*, the drawer 19*a* is shown in the open position wherein the contents of the drawer 19*a* may be accessed. Slides 54*a* and 54*b* enable the drawer 19*a* to move between the closed position and the open position. The inner slides 136 of slides 54*a* are attached to the upper side portions 56 of the drawer 19*a*, and their associated outer slides 138 (shown in more detail in FIGS. 6*a*, 6*b*, and 6*c*) are attached (and remain fixed) to the lower side portions 60 of the container engaging region 44. Meanwhile, the outer slides 138 of slides 54*b* are attached to the lower side portions 58 of the drawer 19*a*, and their associated inner slides 136 are attached to the upper side portions 56 of the drawer 19*b*. The container engaging region 44, to which the outer slides 138 of slides 54*a* are attached, may be restrained by the chassis 78, thereby enabling the inner slides 136 attached to the drawer 19*a* to slide past their associated outer slides 138 into the extended position (for example as shown in FIG. 6*a*) when the drawer 19*a* is pulled to the open position. The drawer 19*b*, to which the inner slides 136 of slides 54*b* are attached, may be restrained and locked in the closed position by the lock member 118 (see FIG. 7*a*), thereby enabling the outer slides 138 attached to the drawer 19*a* to slide past their associated inner slides 136 into the extended position when the drawer 19*a* is pulled to the open position. This arrangement allows for the independent movement of the drawer 19*a*.

When the drawer 19*a* is pushed to the closed position from the open position, the outer slides 138 of slides 54*b* slide along their associated inner slide 136, so that the outer slides 138 and inner slides 136 of slides 54*b* are in the retracted position, for example as shown in FIG. 6*b*. At the same time, the inner slides 136 of slides 54*a* slide along their associated outer slides 138, so that the outer slides 138 and inner slides 136 of slides 54*a* are also in the retracted position.

Figure 4B:
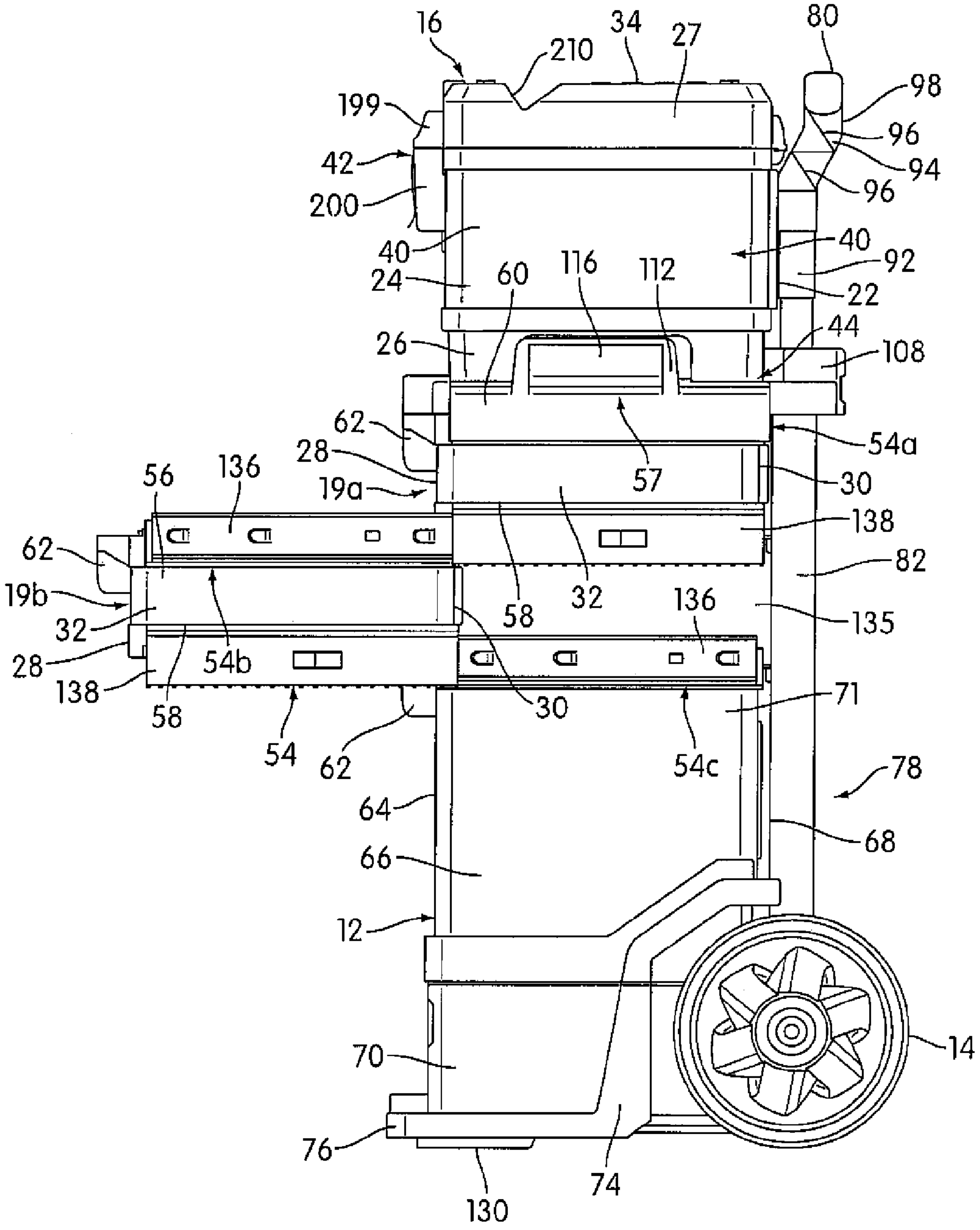

In the embodiment shown in FIG. 4*b*, the drawer 19*b* is in the open position wherein the contents of the drawer 19*b* may be accessed. Slides 54*b* and 54*c* enable the drawer 19*b* to move between the closed position and the open position. The inner slides 136 of slides 54*b* are attached to the upper side portions 56 of the drawer 19*b*, and their associated outer slides 138 are attached to the lower side portions 58 of the drawer 19*a*. Meanwhile, the outer slides 138 of slides 54*c* are attached to the lower side portions 58 of the drawer 19*b*, and their associated inner slides 136 are attached to the upper side portions 71 of the base container 12. The drawer 19*a*, to which the outer slides 138 of slides 54*b* are attached, may be restrained and locked in the closed position by the lock member 118, thereby enabling the inner slides 136 of slides 54*b* to slide past their associated outer slides 138 when the drawer 19*b* is pulled to the open position. Similarly, the base container 12, to which the inner slides 136 of slides 54*c* are attached, may be restrained and locked in the closed position by the lock member 118 (see FIG. 8), thereby enabling the outer slides 138 of slides 54*c* to slide past their associated inner slides 136 when the drawer 19*b* is pulled to the open position. This arrangement allows for the independent movement of the drawer 19*b*. It can be appreciated that when both drawers 19*a* and 19*b* are unlocked, then both can be slidable at the same time.

When the drawer 19*b* is pushed to the closed position from the open position, the outer slides 138 of 54*c* slide along the inner slide 136 of 54*c*, so that the outer slides 138 and inner slides 136 are in the retracted position. At the same time, the inner slides 136 of 54*b* slides into the outer slides 138 of 54*b* so that the outer slide 138 and inner slide 136 are also in the retracted position.

In the embodiment shown in FIGS. 5*a* and 5*b*, the base container 12 is in the open position wherein the contents of the base container 12 may be accessed. Slides 54*c* and 54*d* enable the base container 12 to move between the closed position and the open position. The inner slides 136 of slides 54*c* are attached to the upper side portions 71 of the base container 12, and their associated outer slides 138 are attached to the lower side portions 58 of the drawer 19*b*. Meanwhile, the outer slides 138 of slides 54*d* are attached to the support legs 124 of the chassis 78, and their associated inner slides 136 (not shown) are attached to the side portions 66 of the lower portion 70 of the base container 12. The inner slides 136 of slides 54*d* may be attached to the base container 12 in hollow portions 133 (two are shown in FIG. 5*b*) located in the lower portion 70 of the base container 12. The drawer 19*b*, to which the outer slides 138 of slides 54*c* are attached, may be restrained and locked in the closed position by the lock member 118 (see FIG. 7*a*), thereby enabling the inner slides 136 of slides 54*c* to slide past their associated outer slides 138 when the base container 12 is pulled to the open position. The support legs 124, to which the outer slides 136 of slides 54*d* are attached, may be restrained by the chassis 78, thereby enabling the inner slides 136 of slides 54*d* to slide past their associated outer slides 138 when the base container 12 is pulled to the open position. This arrangement allows for the independent movement of the base container 12 with respect to drawers 19*a* and 19*b*. It should be appreciated that only one, two, or all three of the slidable drawers 19*a* and 19*b* and base container 12 can be movable or locked at any given time.

When the base container 12 is pushed to the closed position from the open position, the inner slides 136 of 54*d* slide along the outer slides 138 of 54*d*, so that the outer slides 138 and inner slides 136 are in the retracted position. At the same time, the inner slides 136 of slides 54*c* slide along the outer slides 138 of 54*c* so that the outer slides 138 and inner slides 136 are also in the retracted position.

The earlier description of the configuration and arrangement of the slides 54*a*, 54*b*, 54*c*, and 54*d* and their attachment to the rolling container assembly 10 is an example and is not intended to be limiting. It is contemplated that the arrangement and configuration of the slides 54*a*, 54*b*, 54*c*, and 54*d* may vary. For example, the slides 54*a*, 54*b*, 54*c*, and 54*d* may be attached to other portions of the rolling container assembly 10. Also, the inner slides 136 and outer slides 138 may be interchangeable in the manner in which they are attached to the rolling container assembly 10. For example, the inner slides 136 of slides 54*b* may be attached to the lower side portions 58 of the drawer 19*a*, instead of to the upper side portions 56 of the drawer 19*b* (as shown in FIG. 4*b*), and their associated outer slides may be attached to the upper side portions 56 of the drawer 19*b*, instead of to the lower side portions 58 of the drawer 19*a* (as shown in FIG. 4*b*).

It is contemplated that the inner slides 136 and outer slides 138 may be attached to the container engaging region 44, the drawers 19*a* and 19*b*, and the base container 12 using attachment mechanisms, such as, for example, adhesive, snap fit, fasteners, pins or rivets, or any combination thereof. It is also contemplated that the inner slides 136 and outer slides 138 of slides 54*a* and 54*b* may be attached to the container engaging region 44, the drawers 19*a* and 19*b*, and the base container 12 using the ears 140 (shown in more detail in FIGS. 6*a*, 6*b*, 6*c*) provided along the inner slides 136 and the outer slides 138. The ears 140 may be engaged to corresponding attachment hooks or receiving members (not shown) on the container engaging region 44, the drawers 19*a* and 19*b*, and the base container 12.

In one embodiment, when the base container 12 is locked in the closed position, the support legs 124 may be hidden from view by the lower portion 70 of the base container 12, as shown in FIGS. 1, 4*a*, and 4*b*. The hollow portions 133 (shown in FIG. 5*b*) in the lower portion 70 of the base container 12 receive the support legs 124 such that when the base container 12 is in the closed position, the support legs 124 are hidden from view by the lower portion 70 of the base container 12. As shown in FIG. 5*b*, when the base container 12 is in the open position, the support legs 124 are no longer in the hollow portions 133 in the lower portion 70 of the base container 12. It is also contemplated that in some embodiments, the support legs 124 may be visible from the side when the base container 12 is in the closed position. For example, the slides 54*d* may be attached to the outside of the base container 12 such that the support legs 124 are astride the side portions 66 of the lower portion 70 of the base container 12.

The slides 54*a*, 54*b*, 54*c*, and 54*d* of the base container 12 and the drawers 19*a* and 19*b* may be used to support the base container 12 and the drawers 19*a* and 19*b* so that they are disposed in a stacked relation. In the embodiment shown in FIGS. 1, 2, 4*a*, 4*b*, 5*a*, and 5*b*, the drawer 19*a* is supported by slides 54*a* and slides 54*b*, the drawer 19*b* is supported by slides 54*b* and slides 54*c*, and the base container 12 is supported by slides 54*c* and 54*d*. As such, in one embodiment, the chassis 78 does not require walls to support the drawers 19*a* and 19*b* and the base container 12 and to enable them to move between the closed and open positions. When the drawers 19*a* and 19*b* are slid into the open position, there may be a space 135 in the container rolling assembly 10.

In the embodiment illustrated in FIGS. 4*a*, 4*b*, 5*a*, and 5*b*, the base container 12 is supported by the support legs 124, and the lower portion 70 of the base container 12 does not engage the ground. It is contemplated that in other embodiments, the lower portion 70 of the base container 12 may engage the ground. There may also be wheels connected to the lower portion 70 of the base container 12 that engage the ground.

Figure 7A:
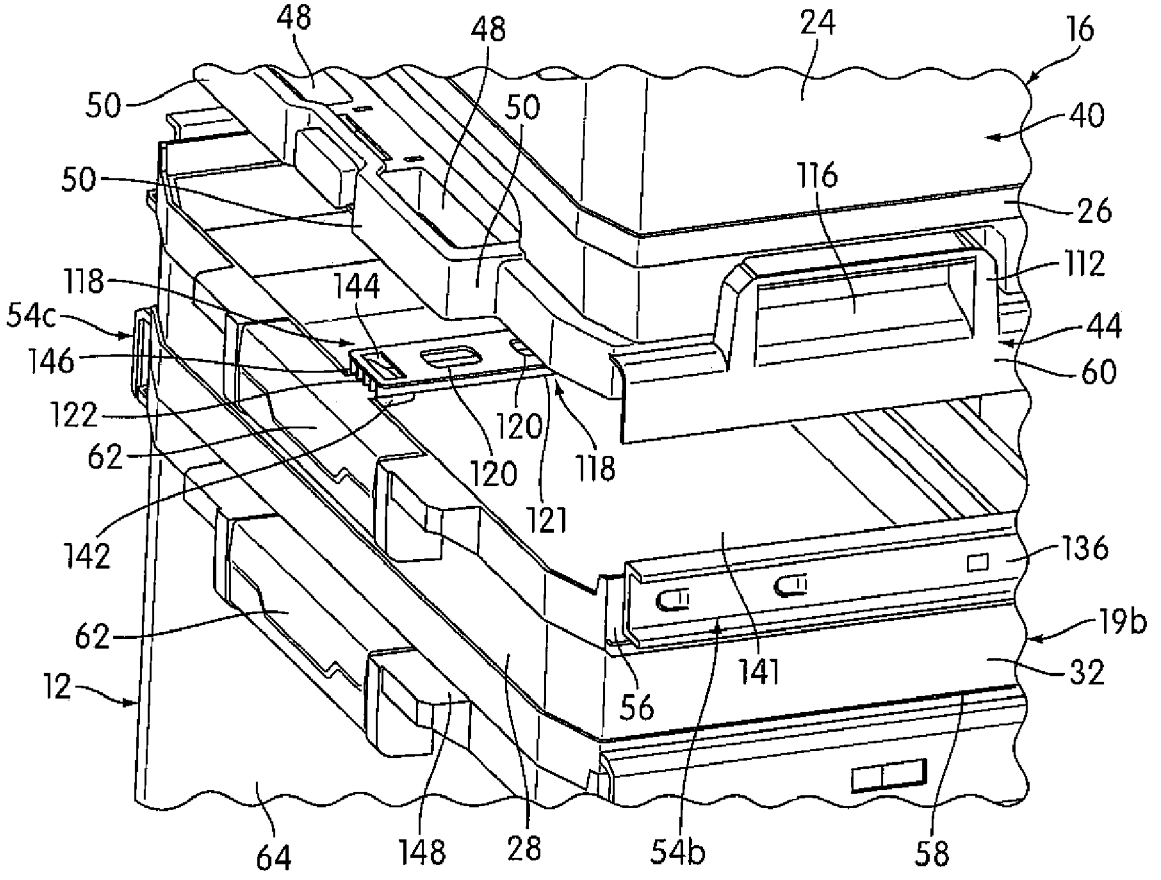
FIG. 7*a* and 7*b* are, respectively, perspective views of a drawer in a locked position and being unlocked from the locked position to an unlocked position.
Figure 7B:
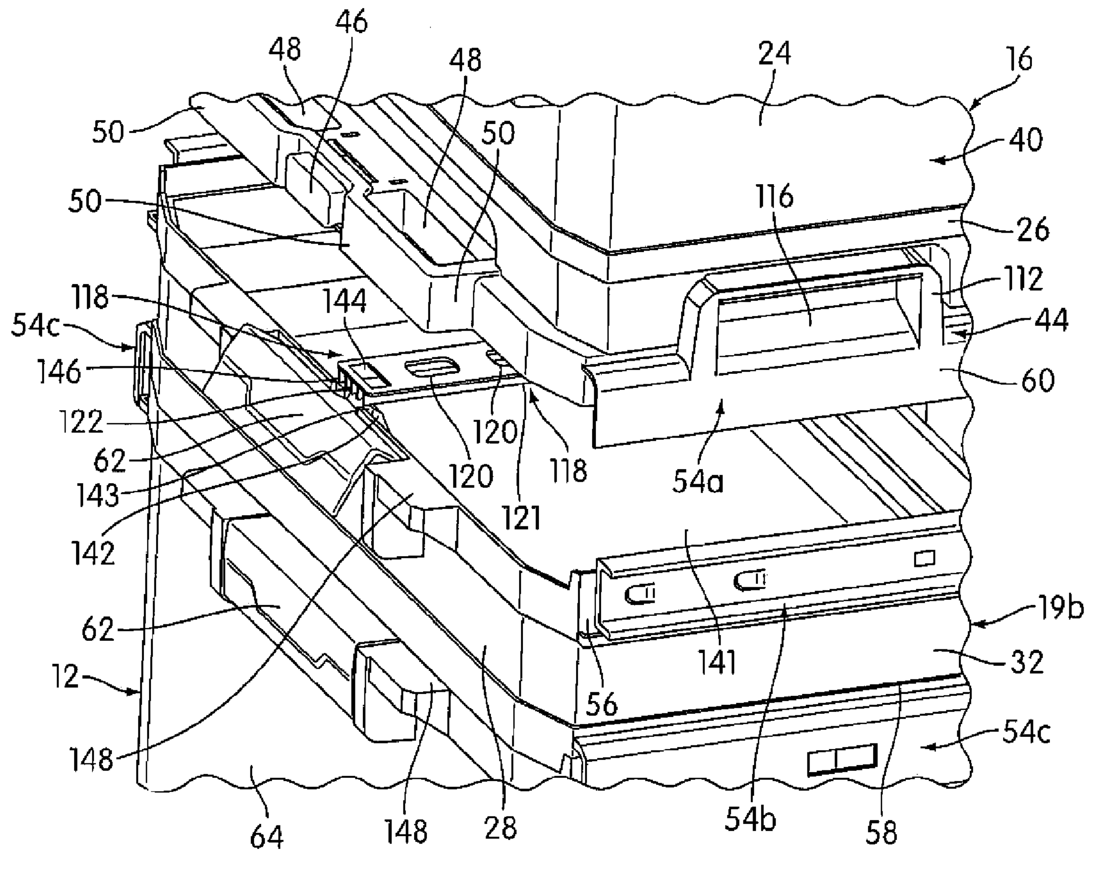

FIG. 7*a* and 7*b* are perspective views of the lower intermediate drawer 19*b* in a locked position and being unlocked from the locked position to an unlocked position. In these Figures, the upper intermediate drawer 19*a* has been removed to better illustrate the lock arrangement. In the embodiment shown in FIG. 7*a*, the lower intermediate drawer 19*b* is locked in the closed position. In this embodiment, the drawer 19*b* has an upwardly facing opening 141 that enables the contents of the drawer 19*b* to be accessed. When the drawer 19*b* is locked in a closed position, the upwardly facing opening 141 is disposed beneath the removable container 16. A protrusion 142 in the handle 62 engages the lock member 118. Specifically, in the embodiment shown in FIG. 7*a*, the lock member 118 comprises an aperture 144, and the protrusion 142 from the handle 62 can be inserted into the aperture 144 to lock the drawers 19*a* and 19*b* in the closed position. In one embodiment, the drawers 19*a* and 19*b* each has a mounting portion 148 on which the handle 62 is attached. When the drawers 19*a* and 19*b* are being unlatched, the handle 62 is pulled so as to be pivoted in an upwards direction against the bias of an internal spring. In other embodiments, the handle 62 may be directly connected to the front portion 28 of the drawers 19*a* and 19*b* having no mounting portion 148. The handle 62 may be attached via various mechanisms, such as, for example, screws, pins, bolts, fasteners, or any other mechanism or hinges as appreciated by one skilled in the art. In the embodiment shown in FIGS. 7*a*, 7*b*, and 8, the drawers 19*a* and 19*b* are made of plastic. It is contemplated that the drawers 19*a* and 19*b* may be fabricated of other materials, such as metal, wood, or any other materials or combination of materials known to a person skilled in the art.

Figure 8:
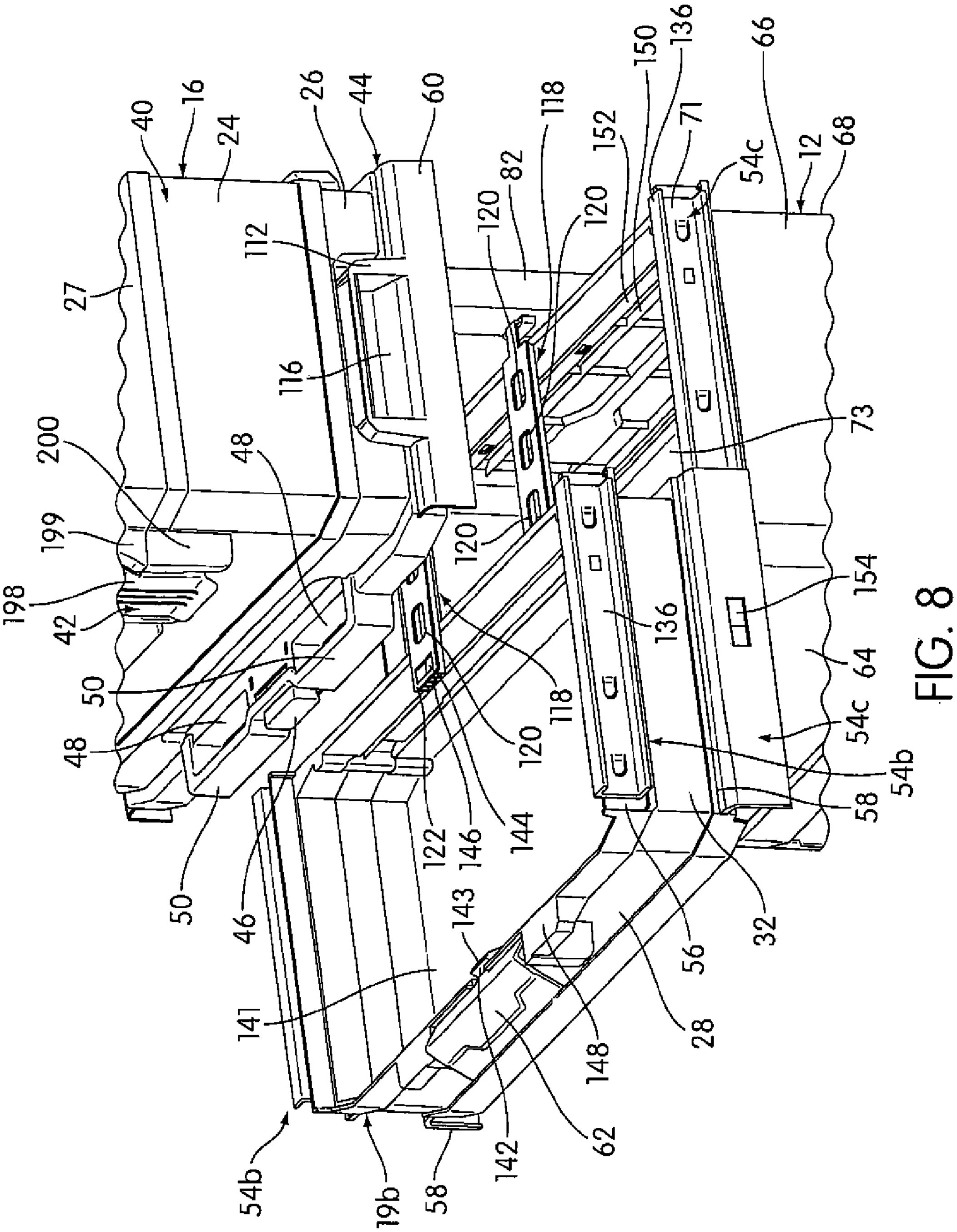
FIG. 8 depicts a drawer in the open position.

In the embodiment shown in FIG. 7*b*, when the handle 62 is pulled upwards against the spring bias, the handle 62 pivots and the protrusion 142 of the handle 62 exits the opening 144. The drawer 19*b* is thus able to be slid to the open position, as shown in FIG. 8. To once again close and lock drawer 19*b*, drawer 19*b* is simply manually slid back towards the closed position. During this movement, the front edge 146 of the lock member 118 engages a cam surface 143 on the protrusion 142. The front edge 146 thus comprises a first cam surface that engages and moves the cam surface 143 on the handle 62 against the bias of the internal handle spring (not shown) so as to move the handle in a pivotal direction (clockwise in FIGS. 7*a* and 7*b*) until the protrusion 142 finds the aperture 144, whereupon the handle 62 springs back to the locked configuration with the protrusion 142 in the aperture 144.

In the embodiment shown in FIG. 8, the base container 12 has an upwardly facing opening 73. When the drawer 19*b* and the base container 12 are in the closed position, the upwardly facing opening 73 of the base container 12 is disposed beneath the upper drawer 19*b*. In one embodiment, there may be strengthening ribs 150 extending along the inside surface 152 of the back portion 68 of the base container 12. The ribs 150 may also be in the shape of a depression 90 formed in the back portion 68 of the base container 12.

In the embodiment shown in FIG. 8, each lower side portion 58 of the drawers 19*a* and 19*b* is a projection that hangs over the edge of the drawers 19*a* and 19*b*. A recess 154 may be located in the lower portion of the drawers 19*a* and 19*b*. It is contemplated that the lower side portion 58 of the drawers 19*a* and 19*b* and the lower side portion 60 of the container engaging region 44 may have other shapes, such as sleeves that enclose the top portion 56 of the drawer 19*a* or 19*b* below.

Figure 9:
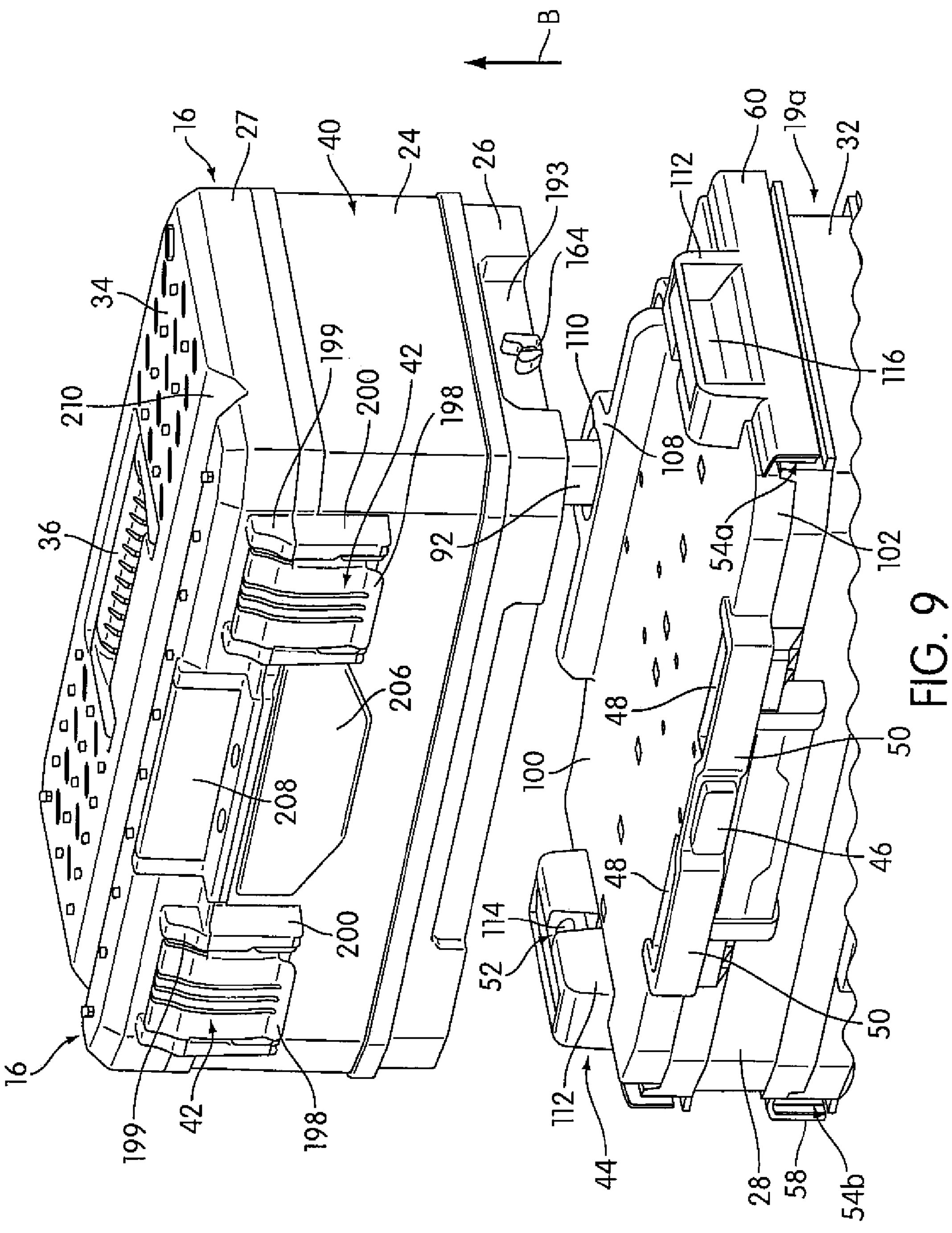
FIG. 9 depicts removing a removable container from the rolling container assembly.

FIG. 9 depicts removing the removable container 16 from the rolling container assembly 1O. In an embodiment, the removable container 16 may be removed from the container engaging region 44. After the removable container 16 has been disengaged from the container engaging region 44, the removable container 16 may be pulled in the direction of B. The actuator 46 may be actuated to release the automatic lock 52 so that the removable container 16 can be disengaged from the container engaging region 44.

Figure 10A:
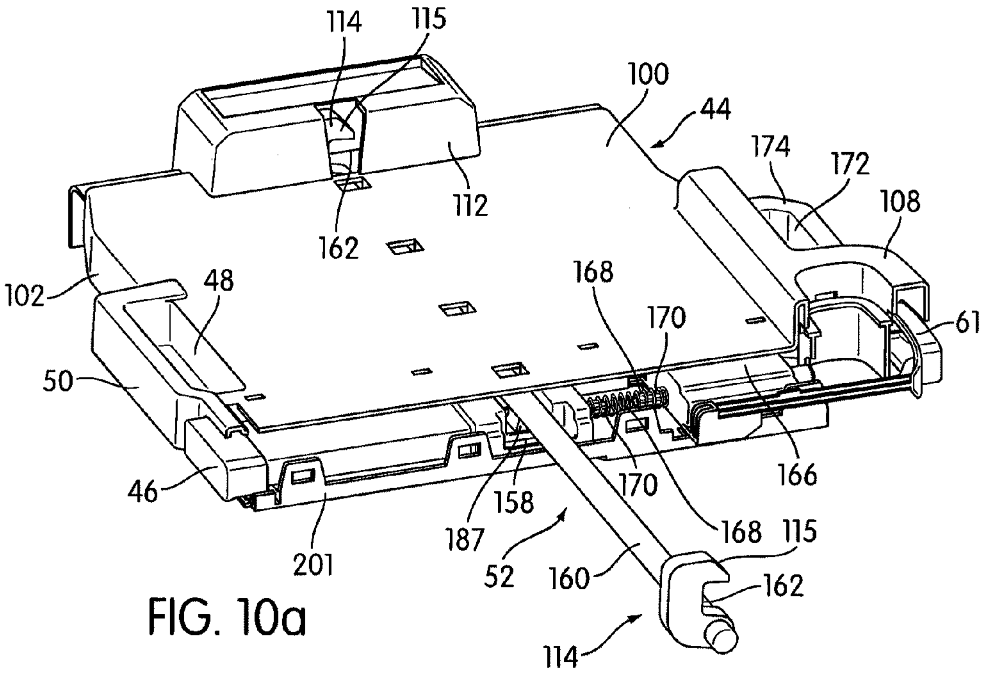
FIG. 10*a* and 10*b* are partial sectional views, with the section taken through the center of the container engaging region from front to back to reveal certain components.
Figure 10B:
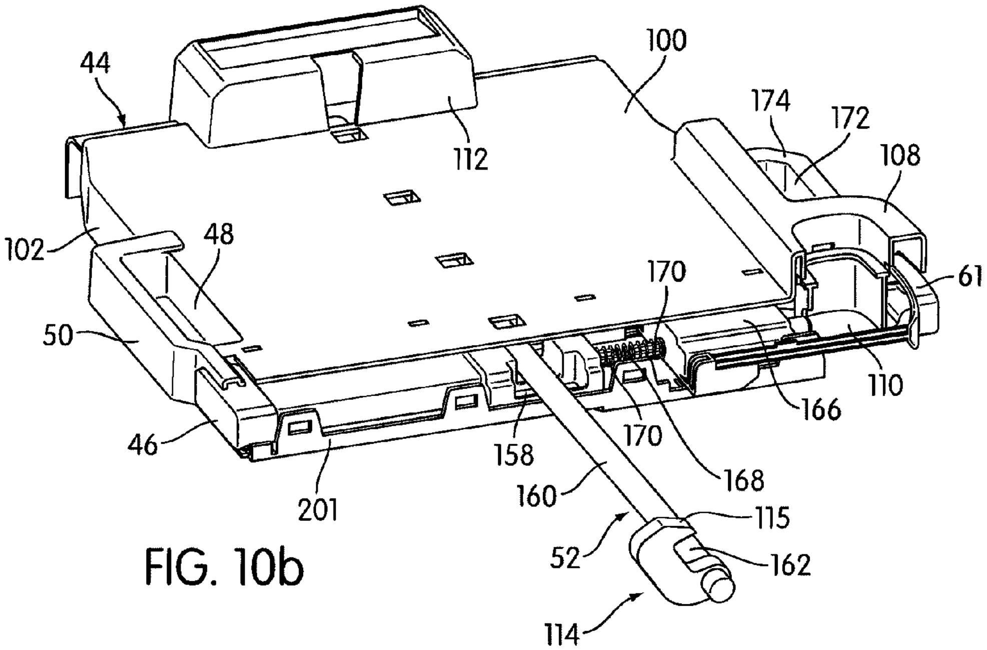

FIGS. 10*a* and 10*b* are partial sectional views, with the section taken through the center of the container engaging region from front to back to better reveal certain components. As shown in FIG. 10*a*, the container engaging region 44 has the automatic lock 52 constructed and arranged to interact between the removable container 16 and the container engaging region 44. In one embodiment, automatic lock 52 includes an actuator 46 to release the lock 52. The lock 52 also includes latch members 114. In the embodiment shown in FIGS. 10*a* and 10*b*, the actuator 46 is elongated and extends along a track 201 rearwardly and through a center region of engaging region 44. In this embodiment, the actuator 46 has a camming portion 158 that rotates a cam portion 187 of the automatic lock 52, which in turn rotates the latch members 114 of the automatic lock 52 to release lock 52. In one embodiment, the automatic lock 52 includes a rod 160 that extends laterally across the container engaging region 44, beneath platform surface 100. The rod 160 is connected to latch members 114 on opposite ends of rod 160. Each latch member 114 has a notch 162 to receive a lock engaging member or locking pin 164 located on the removable container 16 (shown in FIG. 14).

In the embodiment shown in FIG. 10*a*, the handle actuator 61 includes a handle actuating arm 166. In this embodiment, a spring 168 is disposed between the rear end of actuator 46 and the handle actuating arm 166. The rear end of the actuator 46 and the rear end of the handle actuating arm 166 have respective fingers 170 to which the spring 168 is attached, by the fingers 170 extending into the opposite ends of the spring 168.

In the embodiment shown in FIGS. 10*a* and 10*b*, when the actuator 46 of the removable container 16 is actuated by being depressed, the rear end of actuator 46 compresses the spring 168. This movement of the actuator 46 causes the camming portion 158 to cam against the ramp portion or cam 187 provided on the central bottom portion of rod 160 (see FIG. 11 for better view). This camming action rotates rod 160, which in turn rotates latch members 114 in a counter clockwise direction (in the FIGS. 10*a* and 10*b*) from a first (or "lock") position (as shown in FIG. 10*a*) wherein the notches 162 are able to grasp the locking pins 164 (or "lock engagement portion") of the removable container 16 to a second ("release") position wherein the notches 162 are no longer able to grasp the locking pins 164 of the removable container 16 (as shown in FIG. 10*b*). When the latch members 114 are in the first (or "lock") position, the removable container 16 can be locked to the container engaging region 44 by the automatic lock 52. When the latch members 114 are in the second position, the removable container 16 may be disengaged from the container engaging region 44 and may be removed to be carried separately. When the actuator 46 is released, the spring 168 biases the actuator back to its original position, and the cam member 187 rotates the latch members 114 back to the lock position as shown in FIG. 10*a*.

To automatically reattach the containers, the container 16 is simply placed on the container engaging region 44. Specifically, the lock engagement portion 164 (e.g. pins 164) are aligned with upper cam surfaces 115 of the latch members 114. When the pins 164 are forced downwards against cam surfaces 115, this action causes the rod 160 to rotate in a counterclockwise direction (as viewed in FIGS. 10*a* and 10*b*) against the bias of the spring 168. After the latch members 114 have rotated sufficiently so that openings 162 are aligned with the pins 164, the spring 168 rotatably snaps the latch members 114 back to the lock position to lock the container 16 to the engaging region 44. It is contemplated that location and configuration of the automatic lock member 114 may vary. For example, the automatic lock member 114 may not necessarily be located in the center of the container engaging region 44 and may take a different form from the hook configuration as shown. In addition, only a single latch member 114 may be used.

Figure 11:
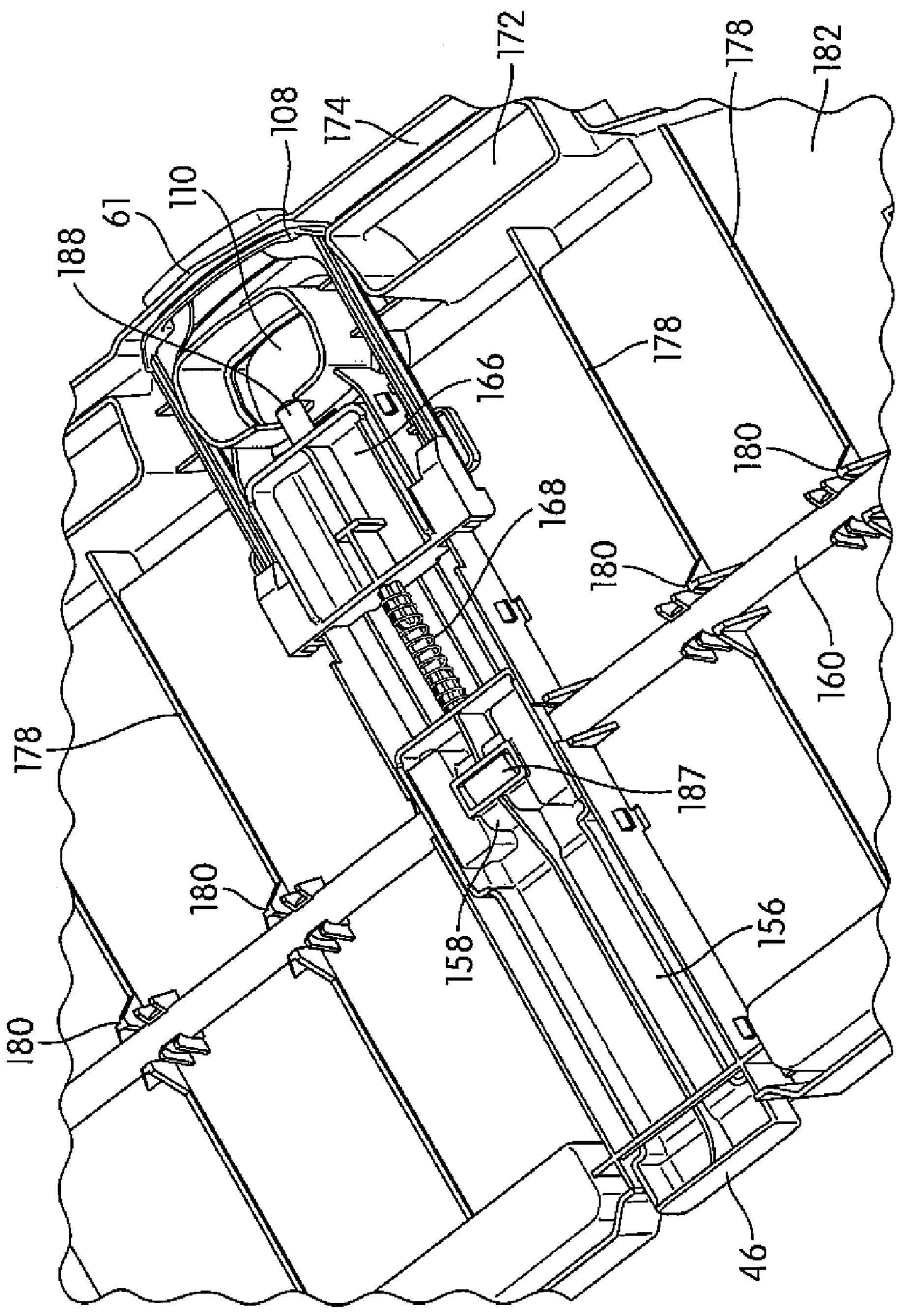
FIG. 11 is a perspective view of the container engaging region from beneath to show details of an automatic lock in accordance with an embodiment of the invention.
Figure 12:
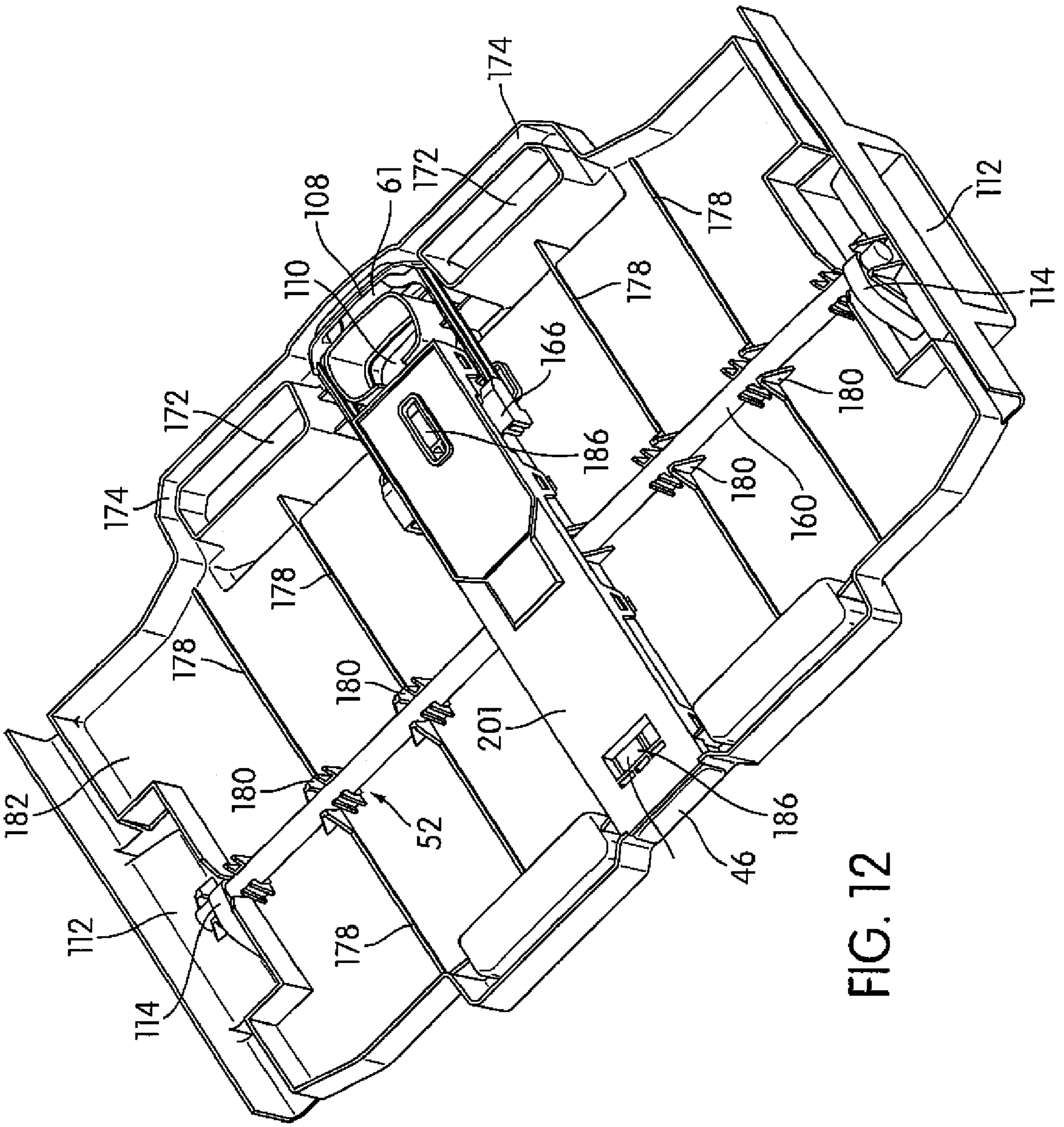
FIG. 12 is a perspective view of the container engaging region from beneath to show details of the automatic lock in accordance with an embodiment of the present invention.

In the embodiment shown in FIGS. 10*a* and 10*b*, the opening 110 for the telescopic handle member 92 is located between two recesses 172 (see FIGS. 11 and 12). These recesses 172 may be located on extensions 174 (one is shown in FIGS. 10*a* and 10*b*) of the container engaging region 44. These recesses 172 may be used as hand grips to facilitate the lifting of the entire rolling container assembly 10.

FIGS. 11 and 12 are perspective views of the container engaging region 44 from beneath to show other details of the automatic lock 52 in accordance with an embodiment of the present invention. In FIG. 11, the container engaging region 44 has ridges 178 and recessed projections 180 located along an inner surface 182 of the container engaging region 44. The recesses in projections 180 securely receive the rod 160, while allowing rod 160 to rotate, as the rod 160 extends from one mounting structure 112 to the other mounting structure 112. The actuator 46 and the handle actuating arm 166 are shown within track 201 with openings 186. In the embodiment shown in FIG. 11, the handle actuating arm 166 has a tab portion 188 located near the opening 110 where the telescopic handle member 92 passes through the container engaging region 44. The purpose of the tab portion 188 will be explained in further detail later.

Figure 13A:
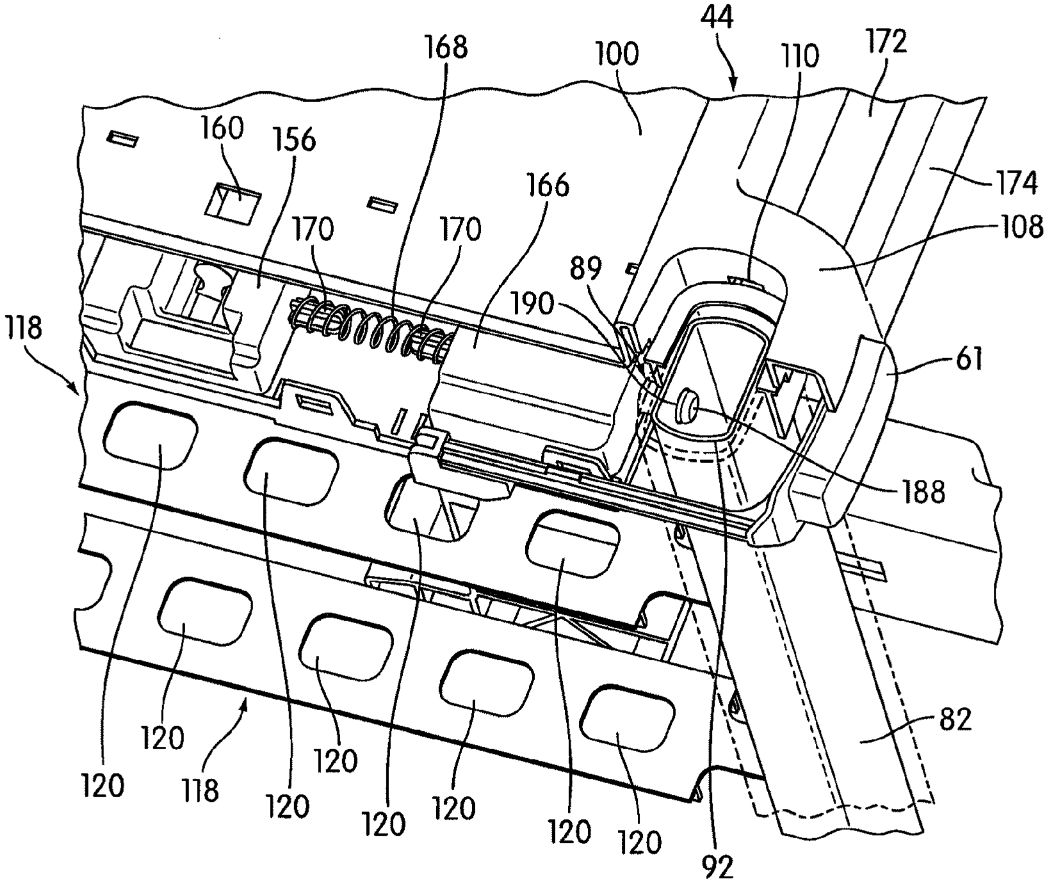
FIG. 13*a* and 13*b* are, respectively, perspective views of a lock mechanism for a handle of the rolling container assembly in an unlocked position and a locked position in accordance with an embodiment of the present invention.
Figure 13B:
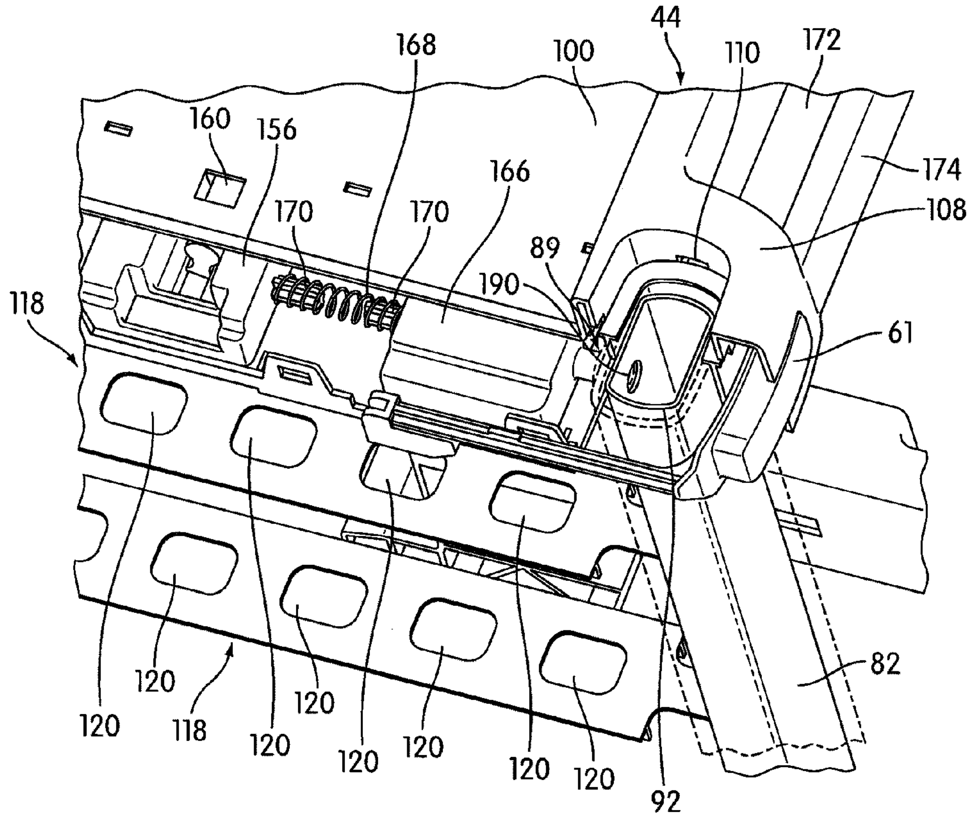

FIG. 13*a* and 13*b* are perspective views of the lock member 89 for the handle 80 of the rolling container assembly 10 in an unlocked position and a locked position, respectively. The lock member 89 includes actuator 61 and the handle actuating arm 166. In the embodiment shown in FIG. 13*a*, the tab portion 188 of the handle actuating arm 166 is in an opening 190 located on the telescopic handle member 92. In this embodiment, when the tab portion 188 is in this position, the telescopic handle member 92 is in a locked position wherein the handle 80 cannot be extended or retracted. In this embodiment, the actuator 61 can be actuated by being depressed against the bias of spring 168 (the actuator 46 supporting the opposite end of spring 168 and being restrained from movement away from arm 166 by a stop member (not shown) in track 201). This actuation allows the handle 80 to be unlocked wherein the handle 80 may be extended or retracted. That is, when the actuator 61 is pressed in the direction of the telescopic handle member 92, the tab portion 188 of the handle actuating arm 166 emerges out of the opening 190 in the telescopic handle member 92 and is no longer in an interfering relation with the telescopic handle member 92 (shown in FIG. 13*b*). With the tab portion 188 in this position, the telescopic handle member 92 may be extended or retracted. When the telescopic handle member 92 is extended or retracted to a desired position and the actuator 61 is released, the spring 168 biases the handle actuating arm 166 back to its original position so that the tab portion 188 snaps into the opening 190 on the telescopic handle member 92 that is aligned with the tab portion 188. With the tab stop portion 188 in this position (as shown in FIG. 13*a*), the telescopic handle member 92 and handle 80 are in the locked position wherein they cannot be extended or retracted.

The telescopic handle member 92 may be fabricated of metal. It is contemplated that the telescopic handle member 92 may be made of plastic, wood, a combination of materials thereof, or any other suitable material as is well known in the art. In some embodiments, the container engaging region 44, the automatic lock 52, the handle actuating arm 166, and the actuator 61 for the handle 80 may be made of plastic. It is also contemplated that the container engaging region 44, the automatic lock 52, the handle actuating arm 166, and the actuator 61 may be made of metal, wood, a combination of materials thereof, or any other suitable material as is well known in the art. It is also contemplated that there may be an opening (not shown) in the central frame structure 82 in which the tab portion 188 of the handle actuating arm 166 passes through when reaching the opening 190 in the telescopic handle member 92.

Figure 14:
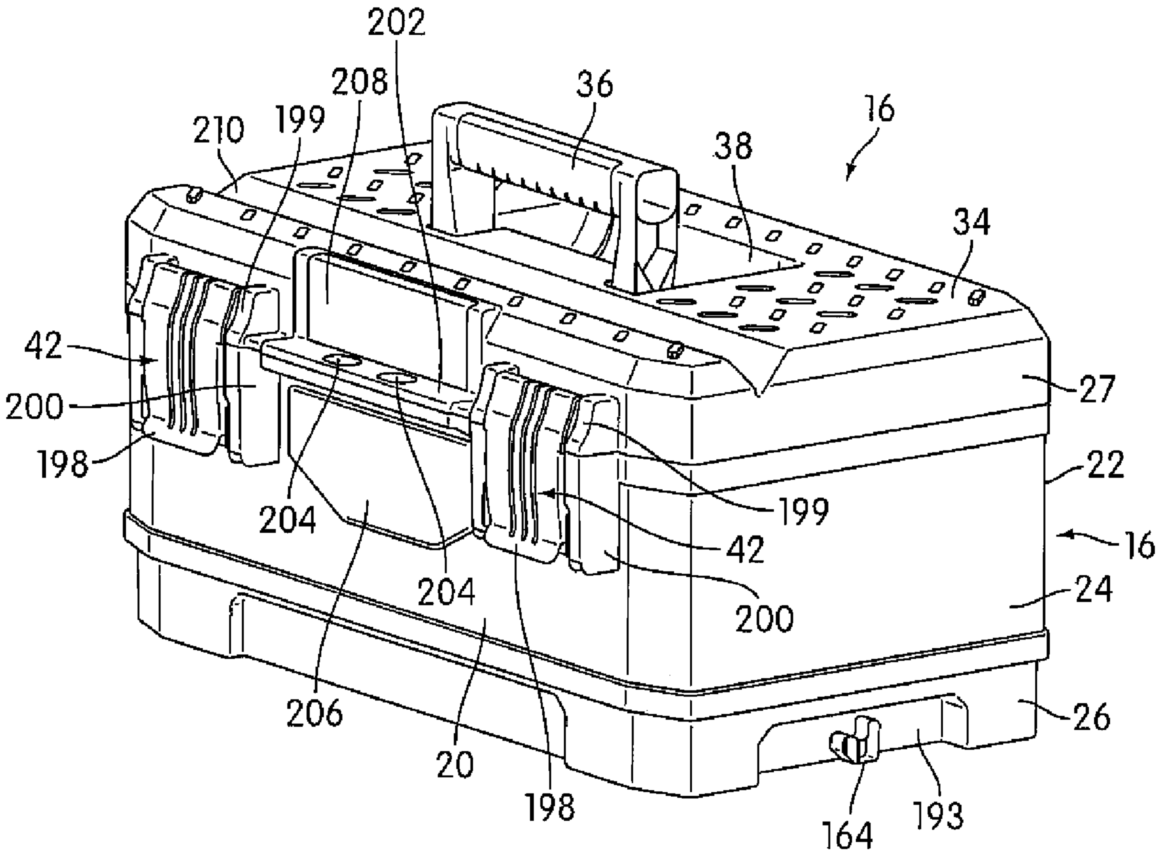
FIG. 14 is a perspective view of the removable container of the rolling container assembly.
Figure 15:
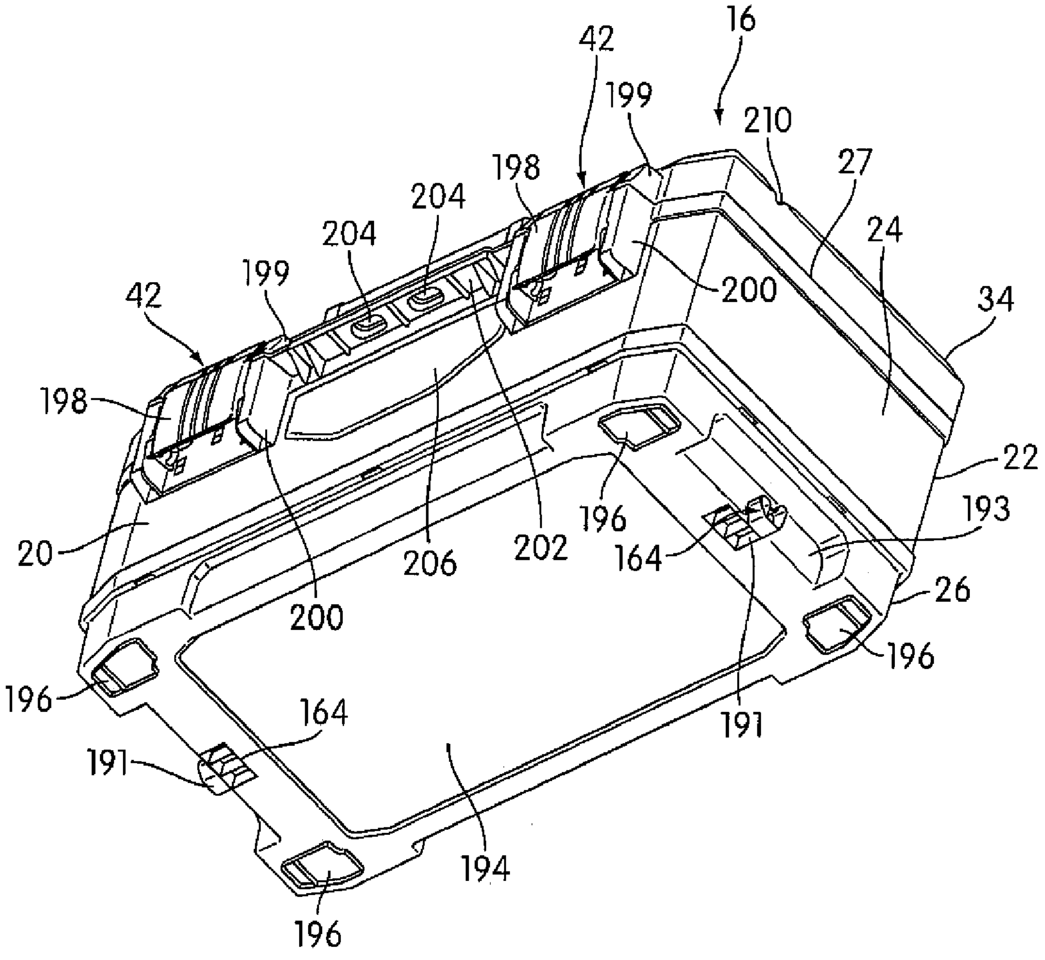
FIG. 15 is a perspective bottom view of the removable container of the rolling container assembly.

FIG. 14 is a perspective view of the removable container 16 of the rolling container assembly 10, and FIG. 15 is a perspective bottom view of the removable container 16 of the rolling container assembly 10. The removable container 16 in one embodiment of the present invention may be found in U.S. Pat. Nos. 6,601,930; 6,347,847; and 6,176,559, the relevant disclosures of which are included by reference thereto as if fully set forth herein. In the embodiments shown in FIG. 14, the removable container 16 has a depression 193 in the lower portion 26 of the side portion 24. The locking pins 164 are projections located on these depressions 193. As shown in FIG. 15, there is a locking pin 164 on each side portion 24 of the removable container 16. It is contemplated that the locking pins 164 may have other configurations or designs. For example, the locking pins 164 may be a rod that extends from the removable container 16 or hooks that hook onto the notches 162 of the automatic lock member 114. Furthermore, the locking pins 164 may not necessarily extend from the depression 193 in the removable container 16. In this embodiment, there are ridges 191 located below the locking pin 164 on the bottom surface 194 of the removable container 16, wherein the ridges 191 may be used to stabilize the removable container 16 when the removable container 16 is engaged to the container engaging region 44. In the embodiment shown in FIG. 15, the removable container 16 has feet 196 located on the corners. It is contemplated that the feet 196 may be made of plastic, rubber, or any other non-slip materials. The removable container 16 may also have a logo plate 208 located on the lid 34. There may also be a logo portion 206 between the latches 42. In the embodiments shown in FIG. 14, the removable container 16 has a groove 210 located on the lid 34. This asymmetrical groove 210 is specifically designed to allow cutting both rectangular wood and round pipe elements. The asymmetry of 63/27 is selected in one embodiment. It is contemplated that the groove 210 may be symmetrical or have other asymmetrical dimensions. The lid 34 may also have treads on its surface to prevent slipping of the material to be cut on the groove. The treads may be diamond shaped or of other shapes. The removable container 16 may also have a ridge 202 protruding from the front portion. There may be recesses 204 located on the ridge 202, as shown in FIG. 14.

In the embodiment shown in FIG. 14, the latches 42 (or a single latch) of the removable container 16 comprise a latch member 198 and a receiving portion 200. The latch member 198 may be pulled to disengage latch engaging portions 199 of the lid 34 so that the lid 34 may opened to allow access to the contents of the removable container 16.

Figure 16:
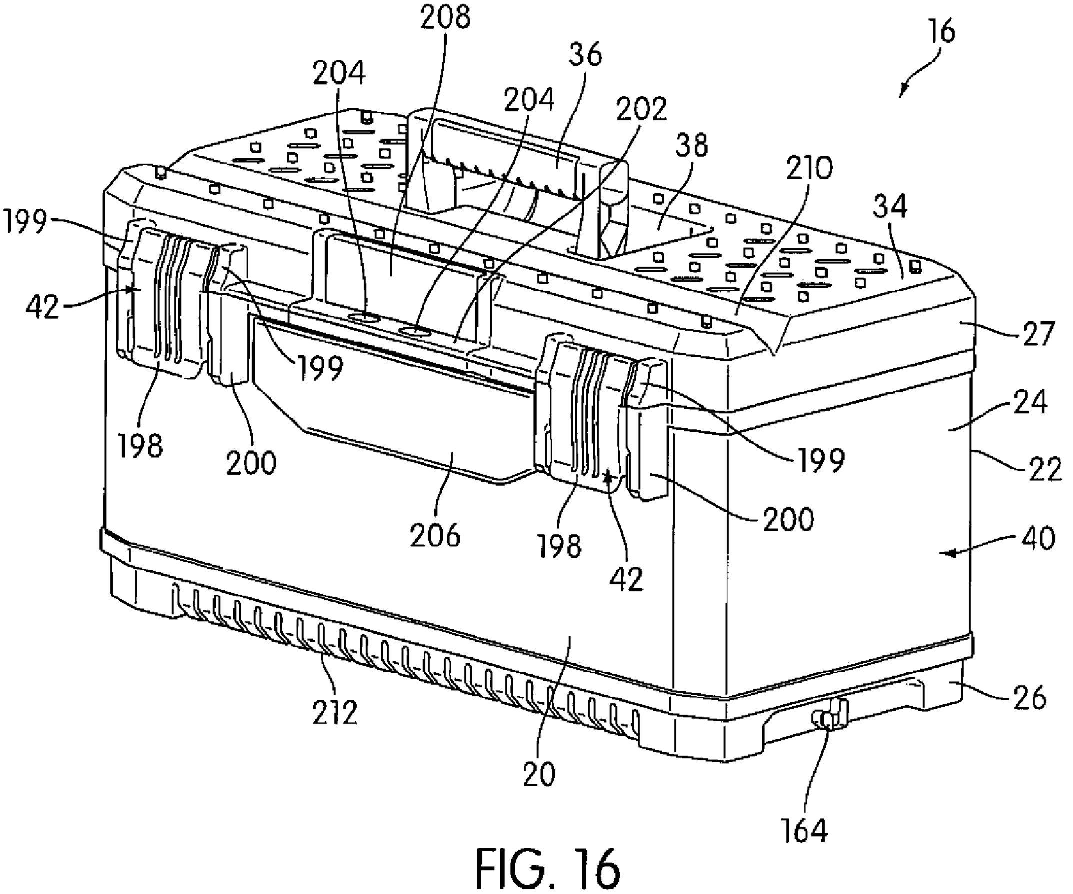
FIG. 16 is a perspective view of the removable container of the rolling container assembly.
Figure 17:
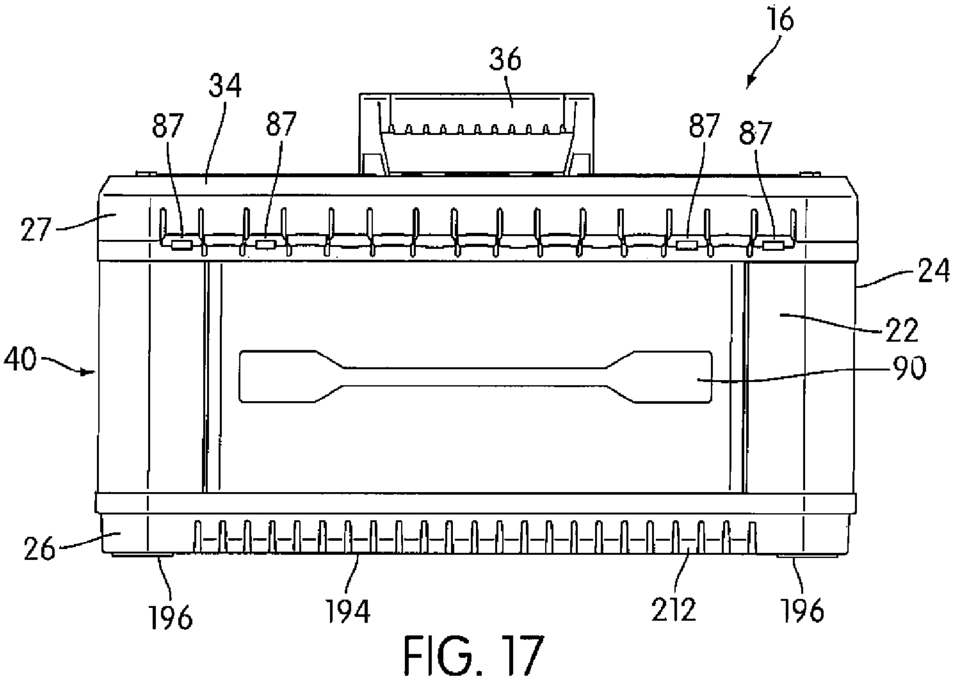
FIG. 17 is a rear view of the removable container of the rolling container assembly.
Figure 18:
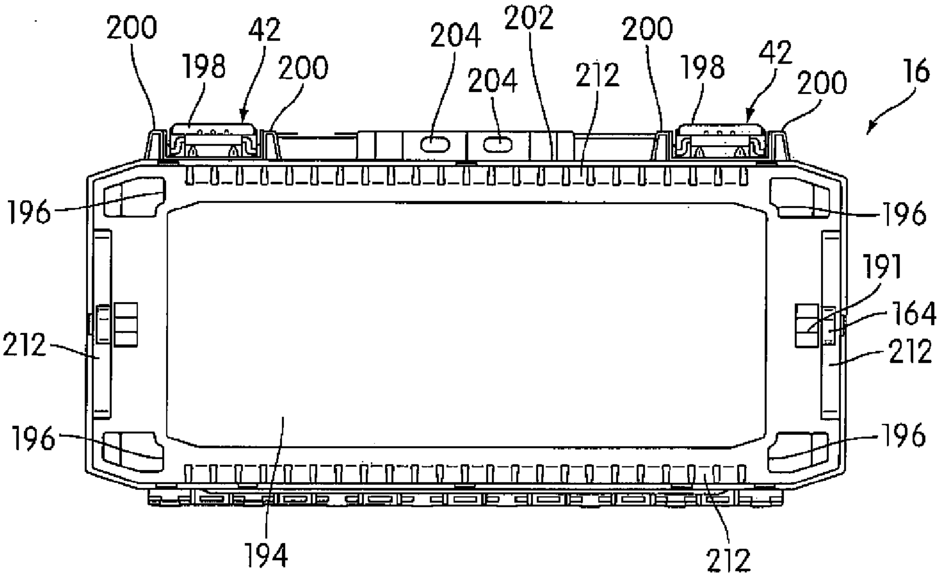
FIG. 18 is a bottom view of the removable container of the rolling container assembly.

FIGS. 16-19 further illustrate the removable container 16 of one embodiment. As shown in FIG. 16, there may be channels 212 formed on the lower portion of the removable container 16. In the embodiment shown in FIG. 17, the lid 34 of the removable container 16 may be attached to the back portion 22 of the removable container 16 via hinges 87. It is contemplated that the lid 34 may be attached using pins, screws, fastenings, bolts, or any other connection mechanism as would be appreciated by one skilled in the art. The bottom of the lid 34 may comprise strengthening ribs (not shown), which may be deployed crosswise with respect to one another. These strengthening ribs may be used to support the lid so that heavy objects can be placed on top of the lid without the lid collapsing.

Figure 19:
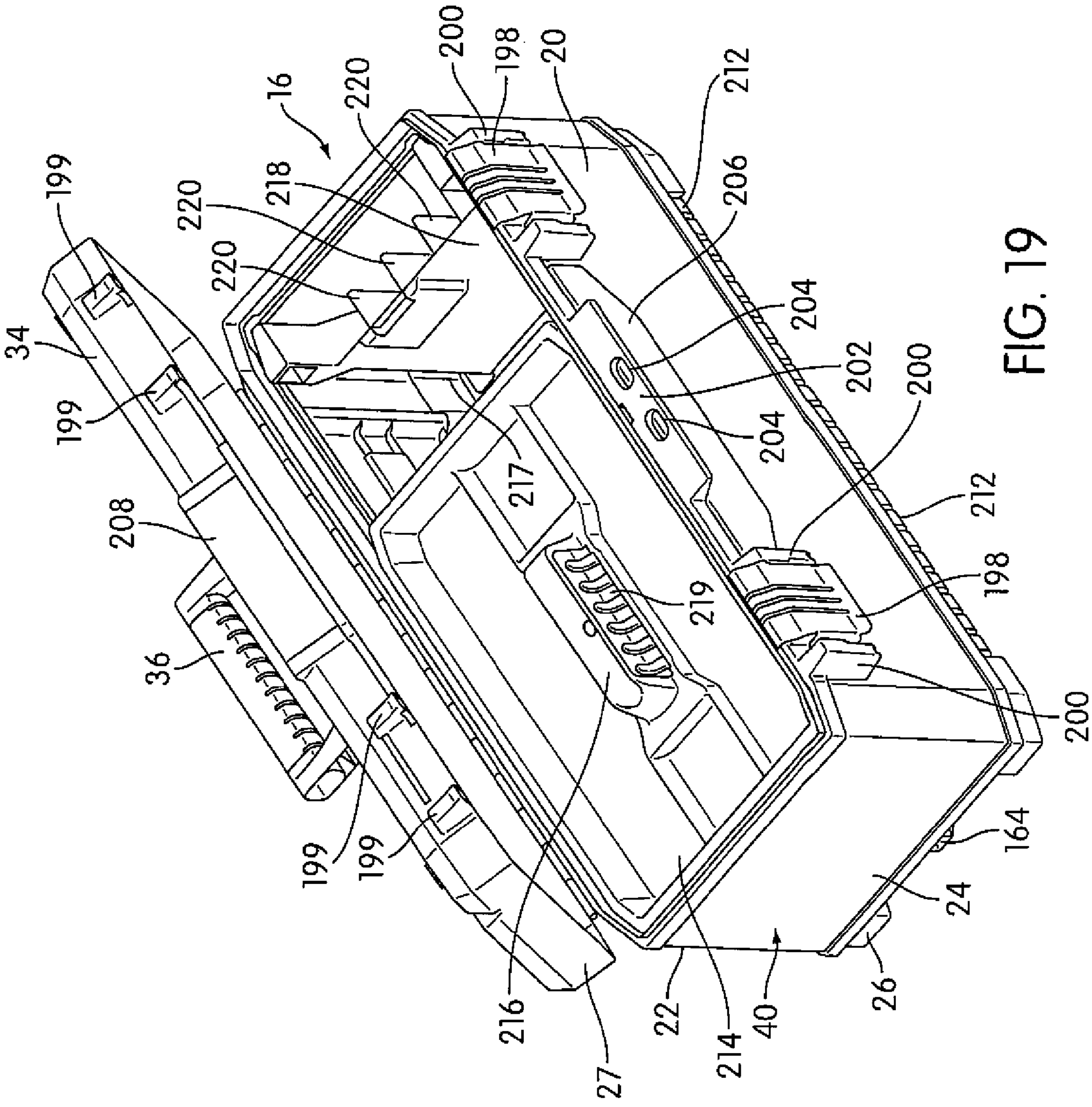
FIG. 19 is a perspective top view of the removable container of the rolling container assembly with the lid in the open position.

As shown in FIG. 19, the removable container 16 may be a toolbox. In the embodiment of FIG. 19, there is an insert 214 having a handle 216 within the removable container 16, the insert 214 being held within an interior space 217 of the removable container 16. A container 218 having partitions 220 may be held in the removable container 16. There may be grooves 219 provided near the handle 216 on the insert 214 to provide grip support when the insert 214 is to be carried separately from the removable container 16. It is contemplated that the configuration of the interior space 217 may vary. For example, there may not necessarily be an insert 214 and container 218 having partitions 220 in the removable container 16. The insert 214 may also be the same size length and width as the removable container 16 such that the insert 214 must be lifted to access the rest of the interior space 217 in the removable container 16.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

What is claimed is:

1. An apparatus for transporting articles between working locations, comprising:

a base container having an interior space in which articles to be transported can be stored, one or more rotatable ground engaging wheels mounted for rotation about an axis to provide rolling support for the apparatus;

at least one removable container having (i) a container portion with an interior space in which articles to be transported can be stored, (ii) a lid pivotally connected to the container portion; (iii) a latch arrangement constructed to secure the lid in covering relation with respect to the container portion, and (iv) a carrying handle attached to the lid and that is manually graspable to enable carriage of the removable container;

a container engaging region disposed above the base container;

an automatic lock interacting between the at least one removable container and the container engaging region, the automatic lock including a latch member that moves from a first position to a second position to lock the at least one removable container to the container engaging region in response to the at least one removable container being engaged with the container engaging region, the automatic lock being releasable so that the at least one removable container can be released from the container engaging region to enable the at least one removable container to be carried by the carrying handle and transported separately from the base container;

and a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

2. The apparatus of claim 1, wherein the container engaging region comprises a support base on which the removable container is disposed when the removable container is in secured relation above the base container.

3. The apparatus of claim 1, wherein the base container is a slidable drawer that slides between open and closed positions.

4. The apparatus of claim 1, wherein the apparatus comprises a support structure providing a generally downwardly facing fixed ground engaging surface, the ground engaging surface being located forwardly of said one or more rotatable ground engaging wheels and being constructed and arranged to engage the ground.

5. The apparatus of claim 4, wherein the support structure comprises one or more slide rails on which the base container may slide between an open position wherein the contents of the base container may be accessed to a closed position wherein the contents of the base container may not be accessed.

6. The apparatus of claim 1, wherein the handle comprises a telescoping member.

7. The apparatus of claim 1, wherein the apparatus comprises a locking member interacting between the handle and the container engaging region, the locking member being releasable so that the handle can extended or retracted.

8. The apparatus of claim 1, wherein the apparatus comprises a first actuator, the first actuator being actuatable to move the automatic lock from a lock position to a release position so that the removable container can be released from the container engaging region to enable the container to be carried by the carrying handle and transported separately from the base container.

9. The apparatus of claim 8, wherein the apparatus comprises a second actuator, the second actuator being actuatable to move a locking member of the handle from a lock position to a release position wherein the handle can be extended or retracted.

10. The apparatus of claim 9, wherein the apparatus comprises a spring attached to the first actuator and the second actuator, and wherein the spring is compressed when either actuator is actuated.

11. The apparatus of claim 1, wherein the automatic lock member engages with respective lock engaging members formed on opposite sides of the removable container when the removable container is engaged with the container engaging region.

12. The apparatus of claim 1, wherein the removable container comprises a toolbox.

13. An apparatus for transporting articles between working locations, comprising:

one or more rotatable ground engaging wheels mounted for rotation about an axis to provide rolling support for the apparatus;

a lower drawer having an interior space in which articles to be transported can be stored;

an upper drawer disposed above the lower drawer and slidable between open and closed positions, the upper drawer having a movable handle;

the lower drawer slidable between open and closed positions, wherein in the closed position, an upwardly facing opening of the lower drawer is disposed beneath the upper drawer;

the lower drawer and upper drawer being independently movable between their respective open and closed positions;

a central frame structure carrying a lock member that enables the upper drawer to be locked in the closed position, the lock member extending forwardly from the central frame structure, the upper drawer being releasable from the forwardly extending lock member upon movement of the movable handle;

and a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

14. The apparatus of claim 13, wherein the apparatus comprises a support structure providing a generally downwardly facing fixed ground engaging surface, the ground engaging surface being located forwardly of said one or more rotatable ground engaging wheels and being constructed and arranged to engage the ground.

15. The apparatus of claim 14, wherein the support structure comprises of slide rails on which the lower drawer slides between open and closed positions.

16. The apparatus of claim 13, wherein the upper drawer slides between open and closed positions on slides located on the upper drawer and the lower drawer beneath said upper drawer.

17. The apparatus of claim 16, wherein the slides comprise ball bearing slides.

18. The apparatus of claim 13, wherein the central frame structure carries a second lock member that enables the lower drawer to be locked in the closed position.

19. The apparatus of claim 18, wherein when the lower drawer is in the closed position, an upwardly facing opening of the lower drawer is disposed beneath the second lock member.

20. The apparatus of claim 13, wherein the lock member comprises an engaging member to engage the upper and lower drawers to enable the upper and lower drawers to be locked in the closed position.

21. The apparatus of claim 13, wherein the handle is attached to a telescoping member.

22. The apparatus of claim 13, wherein the apparatus comprises an actuator, the actuator being actuatable to move a locking member of the handle from a lock position to a release position wherein the handle can be extended or retracted.

23. An apparatus for transporting articles between working locations, comprising:

one or more rotatable ground engaging wheels mounted for rotation about an axis to provide rolling support for the apparatus;

a lower drawer having an interior space in which articles to be transported can be stored;

an upper drawer disposed above the lower drawer;

a slide structure having a first portion mounted to the upper drawer and a second portion mounted to the lower drawer to facilitate movement of the upper and lower drawers between open and closed positions, wherein in the closed position, an upwardly facing opening of the lower drawer is disposed beneath the upper drawer;

the lower drawer and upper drawer being independently movable between their respective open and closed positions;

and a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

24. The apparatus of claim 23, wherein the apparatus comprises a support structure providing a generally downwardly facing fixed ground engaging surface, the ground engaging surface being located forwardly of said one or more rotatable ground engaging wheels and being constructed and arranged to engage the ground.

25. The apparatus of claim 24, wherein the support structure comprises of slide rails on which the lower drawer slides between open and closed positions.

26. The apparatus of claim 23, wherein the handle is attached to a telescoping member.

27. The apparatus of claim 23, wherein the slide structure comprises ball bearing slides.

28. The apparatus of claim 23, wherein the apparatus comprises an actuator, the actuator being actuatable to move a locking member of the handle from a lock position to a release position wherein the handle can be extended or retracted.

* * * * *